US009326138B2

(12) United States Patent
Wynn et al.

(10) Patent No.: US 9,326,138 B2
(45) Date of Patent: Apr. 26, 2016

(54) SYSTEMS AND METHODS FOR DETERMINING LOCATION OVER A NETWORK

(75) Inventors: Simon Wynn, Redwood City, CA (US); John Gordon, Alameda, CA (US); David Whedon Kimdon, Corvallis, OR (US)

(73) Assignee: Devicescape Software, Inc., San Bruno, CA (US)

( * ) Notice: Subject to any disclaimer, the term of this patent is extended or adjusted under 35 U.S.C. 154(b) by 104 days.

(21) Appl. No.: 12/818,108

(22) Filed: Jun. 17, 2010

(65) Prior Publication Data
US 2011/0040870 A1  Feb. 17, 2011

Related U.S. Application Data

(63) Continuation-in-part of application No. 12/240,920, filed on Sep. 29, 2008, which is a continuation-in-part of application No. 11/899,739, filed on Sep. 6, 2007, now Pat. No. 8,196,188.

(60) Provisional application No. 61/218,888, filed on Jun. 19, 2009, provisional application No. 60/976,344, filed on Sep. 28, 2007, provisional application No. 60/824,756, filed on Sep. 6, 2006.

(51) Int. Cl.
*H04W 12/06* (2009.01)
*H04L 29/06* (2006.01)
*H04W 4/00* (2009.01)
*H04W 4/02* (2009.01)
(Continued)

(52) U.S. Cl.
CPC ........... *H04W 12/06* (2013.01); *H04L 63/0428* (2013.01); *H04L 63/06* (2013.01); *H04L 63/08* (2013.01); *H04L 63/0823* (2013.01); *H04L 63/107* (2013.01); *H04L 67/18* (2013.01); *H04W 4/001* (2013.01); *H04W 4/02* (2013.01); *H04W 4/20* (2013.01); *H04W 4/028* (2013.01); *H04W 4/185* (2013.01); *H04W 84/12* (2013.01)

(58) Field of Classification Search
None
See application file for complete search history.

(56) References Cited

U.S. PATENT DOCUMENTS 6,151,628 A  11/2000  Xu et al.
6,161,185 A  12/2000  Guthrie et al.
(Continued)

FOREIGN PATENT DOCUMENTS

EP  1770940  4/2007
GB  2441350  3/2008
(Continued)

OTHER PUBLICATIONS

PCT International Search Report and Written Opinion of the International Searching Authority for International Application PCT/US2010/039092, mailed Aug. 11, 2010, (8 pages).
(Continued)

*Primary Examiner* — Gregory Sefcheck
*Assistant Examiner* — Joshua Smith
(74) *Attorney, Agent, or Firm* — Sheppard, Mullin, Richter & Hampton LLP

(57) ABSTRACT

Systems and methods for determining location over a network are disclosed. In some embodiments, a method comprises scanning, by a digital device, an area for one or more wireless networks, receiving one or more BSSIDs associated with the one or more wireless networks, generating a location request in a DNS protocol formatted message, the location request comprising the one or more BSSIDs, providing the location request, receiving a location response based on the location request, and retrieving at least one location identifier from the location response.

15 Claims, 18 Drawing Sheets

(51) Int. Cl.
*H04W 4/20* (2009.01)
*H04L 29/08* (2006.01)
*H04W 4/18* (2009.01)
*H04W 84/12* (2009.01)

(56) References Cited

U.S. PATENT DOCUMENTS

| | | |
|---|---|---|
| 6,233,577 B1 | 5/2001 | Ramasubramani et al. |
| 6,785,704 B1* | 8/2004 | McCanne .................... 709/201 |
| 6,799,038 B2 | 9/2004 | Gopikanth |
| 6,822,955 B1 | 11/2004 | Brothers et al. |
| 6,871,284 B2 | 3/2005 | Cooper et al. |
| 6,892,230 B1 | 5/2005 | Gu et al. |
| 6,961,857 B1 | 11/2005 | Floryanzia |
| 7,243,369 B2 | 7/2007 | Bhat et al. |
| 7,286,113 B1 | 10/2007 | Lapstun et al. |
| 7,360,087 B2 | 4/2008 | Jorgensen et al. |
| 7,395,083 B2 | 7/2008 | Buckley |
| 7,409,543 B1 | 8/2008 | Bjorn |
| 7,437,755 B2 | 10/2008 | Farino et al. |
| 7,457,950 B1 | 11/2008 | Brickell et al. |
| 7,461,257 B2 | 12/2008 | Olkin et al. |
| 7,469,139 B2 | 12/2008 | van de Groenendaal |
| 7,543,045 B1 | 6/2009 | Agrawal et al. |
| 7,568,220 B2 | 7/2009 | Burshan |
| 7,661,128 B2 | 2/2010 | Chen et al. |
| 7,685,264 B2 | 3/2010 | Tumsi Dayakar et al. |
| 7,735,122 B1 | 6/2010 | Johnson et al. |
| 7,810,143 B2 | 10/2010 | Ruzyski et al. |
| 7,827,252 B2 | 11/2010 | Hopmann et al. |
| 7,840,645 B1 | 11/2010 | Chase et al. |
| 7,898,977 B2* | 3/2011 | Roese et al. ............... 370/254 |
| 7,920,531 B2 | 4/2011 | Gupta et al. |
| 7,930,384 B1 | 4/2011 | Lester et al. |
| 8,005,218 B2 | 8/2011 | Keeler et al. |
| 8,074,259 B1 | 12/2011 | Levy et al. |
| 8,136,148 B1 | 3/2012 | Chayanam et al. |
| 8,155,672 B2 | 4/2012 | Bajpal et al. |
| 8,191,128 B2 | 5/2012 | Nedkov et al. |
| 8,230,516 B2 | 7/2012 | Davison et al. |
| 8,285,992 B2 | 10/2012 | Mathur et al. |
| 8,453,225 B2 | 5/2013 | Agarwal et al. |
| 8,606,885 B2 | 12/2013 | Sunder et al. |
| 2001/0034837 A1 | 10/2001 | Kausik et al. |
| 2002/0116642 A1 | 8/2002 | Joshi et al. |
| 2002/0176366 A1* | 11/2002 | Ayyagari et al. ........... 370/245 |
| 2002/0194501 A1 | 12/2002 | Wenocur et al. |
| 2002/0199096 A1 | 12/2002 | Wenocur et al. |
| 2003/0004994 A1 | 1/2003 | Kamrowski et al. |
| 2003/0096595 A1 | 5/2003 | Green et al. |
| 2003/0097592 A1 | 5/2003 | Adusumilli |
| 2003/0135765 A1 | 7/2003 | Hind et al. |
| 2003/0163740 A1 | 8/2003 | Thjai et al. |
| 2003/0169713 A1 | 9/2003 | Luo |
| 2003/0188201 A1 | 10/2003 | Venkataramappa |
| 2003/0204748 A1 | 10/2003 | Chiu |
| 2003/0217137 A1 | 11/2003 | Roese et al. |
| 2004/0003060 A1 | 1/2004 | Asoh et al. |
| 2004/0003081 A1 | 1/2004 | Justus |
| 2004/0031058 A1 | 2/2004 | Reisman |
| 2004/0103282 A1 | 5/2004 | Meier et al. |
| 2004/0105433 A1* | 6/2004 | Seo ............................ 370/352 |
| 2004/0122959 A1 | 6/2004 | Lortz |
| 2004/0162818 A1 | 8/2004 | Shaw |
| 2004/0168090 A1 | 8/2004 | Chawla et al. |
| 2004/0193707 A1* | 9/2004 | Alam et al. ................. 709/223 |
| 2005/0021781 A1* | 1/2005 | Sunder et al. .............. 709/229 |
| 2005/0059416 A1 | 3/2005 | Ono |
| 2005/0066033 A1 | 3/2005 | Cheston et al. |
| 2005/0097051 A1 | 5/2005 | Madill, Jr. et al. |
| 2005/0102662 A1 | 5/2005 | Samsalovic et al. |
| 2005/0144237 A1 | 6/2005 | Heredia et al. |
| 2005/0147060 A1 | 7/2005 | Buckley |
| 2005/0177515 A1 | 8/2005 | Kalavade et al. |
| 2005/0177750 A1 | 8/2005 | Gasparini et al. |
| 2005/0232189 A1* | 10/2005 | Loushine .................... 370/328 |
| 2005/0232209 A1 | 10/2005 | Buckley et al. |
| 2005/0246431 A1 | 11/2005 | Spitaels |
| 2005/0260973 A1 | 11/2005 | van de Groenendaal |
| 2006/0020684 A1 | 1/2006 | Mukherjee et al. |
| 2006/0026289 A1 | 2/2006 | Lyndersay et al. |
| 2006/0041931 A1 | 2/2006 | Boxall et al. |
| 2006/0047830 A1 | 3/2006 | Nair et al. |
| 2006/0048213 A1 | 3/2006 | Cheng et al. |
| 2006/0048214 A1 | 3/2006 | Pennington et al. |
| 2006/0056317 A1* | 3/2006 | Manning et al. ............ 370/254 |
| 2006/0069782 A1 | 3/2006 | Manning et al. |
| 2006/0094403 A1 | 5/2006 | Norefors et al. |
| 2006/0123133 A1* | 6/2006 | Hrastar ....................... 709/238 |
| 2006/0130140 A1 | 6/2006 | Andreev et al. |
| 2006/0135155 A1 | 6/2006 | Chung et al. |
| 2006/0142034 A1* | 6/2006 | Wentink et al. ............ 455/515 |
| 2006/0149844 A1* | 7/2006 | Droz et al. .................. 709/227 |
| 2006/0174127 A1 | 8/2006 | Kalavade et al. |
| 2006/0187858 A1 | 8/2006 | Kenichi et al. |
| 2006/0200503 A1 | 9/2006 | Dosa et al. |
| 2006/0215622 A1 | 9/2006 | Abdel-Kader et al. |
| 2006/0221919 A1 | 10/2006 | McRae et al. |
| 2007/0011725 A1 | 1/2007 | Sahay et al. |
| 2007/0019670 A1 | 1/2007 | Falardeau |
| 2007/0054654 A1 | 3/2007 | Jones |
| 2007/0073817 A1 | 3/2007 | Gorty |
| 2007/0073868 A1 | 3/2007 | Nelson et al. |
| 2007/0076612 A1 | 4/2007 | Iyer et al. |
| 2007/0081477 A1 | 4/2007 | Jakkahalli et al. |
| 2007/0091861 A1 | 4/2007 | Gupta et al. |
| 2007/0094401 A1 | 4/2007 | Gagne et al. |
| 2007/0113269 A1 | 5/2007 | Zhang |
| 2007/0124490 A1 | 5/2007 | Kalavade et al. |
| 2007/0127423 A1 | 6/2007 | Ho |
| 2007/0171910 A1 | 7/2007 | Kumar |
| 2007/0209065 A1 | 9/2007 | Branam et al. |
| 2007/0255834 A1* | 11/2007 | Abhishek et al. ........... 709/226 |
| 2007/0256122 A1 | 11/2007 | Foo et al. |
| 2007/0270129 A1 | 11/2007 | Luo |
| 2007/0275701 A1* | 11/2007 | Jonker ........................ 455/414.1 |
| 2007/0300309 A1 | 12/2007 | Naito |
| 2008/0008121 A1 | 1/2008 | Alizadeh-Shabdiz |
| 2008/0016230 A1 | 1/2008 | Holtmanns et al. |
| 2008/0037715 A1* | 2/2008 | Prozeniuk et al. .......... 379/45 |
| 2008/0060064 A1 | 3/2008 | Wynn et al. |
| 2008/0060065 A1 | 3/2008 | Wynn et al. |
| 2008/0060066 A1 | 3/2008 | Wynn et al. |
| 2008/0065774 A1 | 3/2008 | Keeler |
| 2008/0082662 A1 | 4/2008 | Dandliker et al. |
| 2008/0144589 A1 | 6/2008 | Buckley |
| 2008/0171556 A1 | 7/2008 | Carter |
| 2008/0189788 A1 | 8/2008 | Bahl |
| 2008/0195741 A1 | 8/2008 | Wynn et al. |
| 2008/0225749 A1 | 9/2008 | Peng et al. |
| 2008/0276305 A1 | 11/2008 | Chan et al. |
| 2008/0281716 A1 | 11/2008 | Nagoya et al. |
| 2008/0293404 A1 | 11/2008 | Scherzer et al. |
| 2009/0024550 A1 | 1/2009 | Wynn et al. |
| 2009/0028082 A1 | 1/2009 | Wynn et al. |
| 2009/0031125 A1 | 1/2009 | Bjorn |
| 2009/0085806 A1 | 4/2009 | Piersol et al. |
| 2009/0128335 A1 | 5/2009 | Leung |
| 2009/0147792 A1 | 6/2009 | Anschutz et al. |
| 2009/0177801 A1 | 7/2009 | Chambers, Jr. et al. |
| 2009/0222537 A1 | 9/2009 | Watkins et al. |
| 2009/0222740 A1 | 9/2009 | Yuan |
| 2009/0279492 A1 | 11/2009 | Montemurro et al. |
| 2010/0049810 A1 | 2/2010 | Maeda |
| 2010/0066839 A1 | 3/2010 | Azuma et al. |
| 2010/0085443 A1 | 4/2010 | Maeda et al. |
| 2010/0095359 A1 | 4/2010 | Gordon |
| 2010/0100951 A1 | 4/2010 | Kutt et al. |
| 2010/0142484 A1 | 6/2010 | Bachmann et al. |
| 2010/0153704 A1 | 6/2010 | Winslow |
| 2010/0263022 A1 | 10/2010 | Wynn et al. |
| 2010/0275249 A1 | 10/2010 | McCann et al. |
| 2012/0058793 A1 | 3/2012 | Voyer et al. |

(56) References Cited

U.S. PATENT DOCUMENTS

FOREIGN PATENT DOCUMENTS

| | | |
|---|---|---|
| JP | 11282804 | 10/1999 |
| JP | 2001359172 | 12/2001 |
| JP | 2003196241 | 7/2003 |
| JP | 2004194098 | 7/2004 |
| JP | 2004310581 | 11/2004 |
| JP | 2005253018 | 9/2005 |
| JP | 2005286783 | 10/2005 |
| JP | 2006126916 | 5/2006 |
| JP | 2006279381 | 10/2006 |
| WO | 0030285 | 5/2000 |
| WO | 2003102730 | 12/2003 |
| WO | 2004097590 | 11/2004 |
| WO | 2005013582 | 2/2005 |
| WO | 2005065038 | 7/2005 |
| WO | 2005065237 | 7/2005 |
| WO | 2005096160 | 10/2005 |
| WO | 2008033913 | 3/2008 |
| WO | 2009043048 | 4/2009 |
| WO | 2010148260 | 12/2010 |
| WO | 2010151692 | 12/2010 |

OTHER PUBLICATIONS

Zündt et al. "Seamless Handoff in Community Based and Location Aware Heterogeneous Wireless Networks," 8th International Workshop on Mobile Multimedia Conference, Oct. 5-8, 2003, pp. 1-5, XP002281321.
Search Report mailed Apr. 1, 2011 from European Patent Application No. 08834360.3 filed Sep. 29, 2008.
Search Report mailed Apr. 4, 2011 from European Patent Application No. 08833721.7 filed Sep. 29, 2008.
Search Report mailed Feb. 10, 2011 from European Patent Application No. 07837822.1 filed Sep. 6, 2007.
Search Report mailed Feb. 10, 2011 from European Patent Application No. 07837823.9 filed Sep. 6, 2007.
Search Report mailed Feb. 10, 2011 from European Patent Application No. 07837824.7 filed Sep. 6, 2007.
Search Report and Written Opinion mailed Apr. 26, 2012 from International Serial No. PCT/US2012/025121 filed Feb. 14, 2012.
Search Report and Written Opinion mailed Aug. 30, 2010 from International Serial No. PCT/US2010/039859 filed Jun. 24, 2010.
PCT International Search Report and Written Opinion dated Nov. 20, 2009 for International Application No. PCT/US2009/060532, 8 pages.
PCT International Search Report and Written Opinion dated Jul. 18, 2008 for International Application No. PCT/US2007/19464, 8 pages.
PCT International Search Report and Written Opinion dated Jun. 12, 2008 for International Application No. PCT/US2007/19462, 6 pages.
PCT International Search Report and Written Opinion dated May 21, 2008 for International Application No. PCT/US2007/19463, 7 pages.
PCT International Search Report and Written Opinion dated Dec. 3, 2008 for International Application No. PCT/US2008/78191, 7 pages.
PCT International Search Report and Written Opinion dated Dec. 8, 2008 for International Application No. PCT/US2008/78198, 10 pages.
Holtmanns et al., U.S. Appl. No. 60/818,517, filed Jul. 6, 2006, referenced in US 2008/0016230, 30 pages.
PCT International Search Report and Written Opinion dated Mar. 2, 2010 for International Application No. PCT/US2010/021409, 9 pages.
Kurita, Hiroyuki et al., "Network Attachment Control Scheme for Onymous IP Terminals in Nomadic Services," IEICE Technical Report, vol. 107, No. 315, pp. 13-18, Nov. 8, 2007.
Rigney, C. et al., "Remote Authentication Dial in User Service (RADIUS)," The Internet Society, Network Working Group, Request for Comments 2865 (RFC 2865), Jun. 2000 [retrieved online at http://tools.ietf.org/search/rfc2865 on Feb. 12, 2014].
Anton, B. et al., "Best Current Practices for Wireless Internet Service Provider (WISP) Roaming," Wi-Fi Alliance, Feb. 2003.
Examination Report mailed May 13, 2013 from European Patent Application No. 08833721.7 filed Sep. 29, 2008.
Examination Report mailed May 13, 2013 from European Patent Application No. 08834360.3 filed Sep. 29, 2008.
Search Report mailed Feb. 6, 2013 from European Patent Application No. 09821134.5 filed Oct. 13, 2009.
Search Report mailed May 13, 2013 from European Patent Application No. 10732222.4 filed Jan. 19, 2010.
McCann, Stephen et al., "Novel WLAN Hotspot Authentication," Fifth IEE International Conference on 3G Mobile Communication Technologies, Oct. 18, 2004, pp. 59-63.
Bauer, Kevin et al., "Mitigating Evil Twin Attacks in 802.11," IEEE Performance, Computing and Communications Conference (IPCCC 2008), Dec. 7, 2008, pp. 513-516.
Fukunaga, Yuji, "Application Management of Windows System Aimed One Step Higher: Wishing to Use Wirless Lan by and by," Monthly Network Magazine, ASCII Corporation, vol. 6, No. 6, pp. 152-155, Jun. 1, 2001.
Search Report mailed Oct. 14, 2013 from European Patent Application No. 10792679.2 filed Jun. 24, 2010.
Search Report mailed Jan. 8, 2014 from European Patent Application No. 10790227.2 filed Jun. 17, 2010.
Search Report mailed Jan. 19, 2016 from European Patent Application No. 12747799.0 filed Jun. 27, 2007.

* cited by examiner

SYSTEMS AND METHODS FOR DETERMINING LOCATION OVER A NETWORK

CROSS-REFERENCE TO RELATED APPLICATION

The present application claims benefit of U.S. Provisional Patent Application No. 61/218,888 filed Jun. 19, 2009, and entitled "Systems and Methods for Locating and Accessing a Wireless Network" which is incorporated by reference.

The present application is a continuation-in-part of U.S. Nonprovisional patent application Ser. No. 12/240,920 filed Sep. 29, 2008, and entitled "Systems and Methods for Wireless Network Selection" which claims benefit of U.S. Provisional Patent Application No. 60/976,344 filed Sep. 28, 2007, and entitled "Systems and Methods for Opportunistic Access to Free and Open Wireless Networks" which are both incorporated herein by reference.

U.S. Nonprovisional patent application Ser. No. 12/240,920 is also a continuation-in-part of U.S. Nonprovisional patent application Ser. No. 11/899,739, filed Sep. 6, 2007, now U.S. Pat. No. 8,196,188 entitled "Systems and Methods for Providing Network Credentials" which claims benefit of U.S. Provisional Patent Application No. 60/824,756 filed Sep. 6, 2006, and entitled "Network Credential Discovery Using DNS," which are hereby incorporated by reference. U.S. Nonprovisional patent application Ser. No. 12/240,920 is also related to co-pending U.S. patent application Ser. No. 11/899,697, entitled "System and Method for Acquiring Network Credentials," filed Sep. 6, 2007, and co-pending U.S. patent application Ser. No. 11/899,638, entitled "Systems and Methods for Obtaining Network Access," filed Sep. 6, 2007, both of which are incorporated by reference.

BACKGROUND

1. Field of the Invention

The present invention generally relates to accessing communication networks. More particularly, the invention relates to the determining location over a network.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology. Various cellular (e.g. GSM, CDMA and the like), Wi-Fi (i.e. IEEE 802.11), WiMAX (i.e. IEEE 802.16), and other technologies have enabled a wide range of access options for a potential network user. Many wireless access points or "hotspots" are accessible only with local geographic regions—in some cases as small as a specific business or other address. In addition, strategically placed hotspots may provide public or private network access for a diverse group of people.

The owners or managers of hotspots often require password and the like to enable user access. As a result, a user of multiple hotspots may have to store, remember, or otherwise manage a large number of passwords. Many users may store their passwords on a laptop computer they use to access the hotspot. However, not all devices capable of accessing hotspots are laptop computers; cellular phones, personal digital assistants (PDAs), and many other devices are now capable of wireless access. Unfortunately, users often cannot easily enter the password on the device or store the password within the device. For example, some devices capable of wireless access may not have a keyboard. Even when a device includes a keyboard, the keyboard is often small and may be of limited functionality, especially for users with limited finger dexterity.

When users store passwords on a laptop computer, the user must first access the laptop computer and store the correct password within the computer. When a password changes, the user is required to update the password within the computer. Additionally, having the username and password stored in the device presents a security problem should the device be lost or stolen.

Further, users are typically required to enter a password, username, and navigate a website to obtain network access. This process is time consuming and the user may enter the wrong information and be forced to re-enter data.

When users enter a password manually, they are less apt to remember difficult passwords. As a result, simple password access is susceptible to hacking and may compromise the user's network access, the hotspot, and/or the user's personal information. Moreover, the user's network access may be stolen if the user's simple password is hacked or simply guessed.

Connecting to wireless networks has traditionally been a complex process for users of wireless devices for other reasons. Typically, the user enters an area where two or more Wi-Fi networks are present, selects the Wi-Fi function on their laptop, and views a series of 'scan results' listing the available Wi-Fi networks. In one example, the listing of available Wi-Fi networks comprises a list of Wi-Fi network SSID identifiers. Users must often identify which Wi-Fi networks do not have encryption or other security mechanisms (e.g., a login page). To add to user frustration, some of the wireless networks may be functional while others may be misconfigured in such a way that renders the network unusable.

The user typically makes an arbitrary decision which Wi-Fi network to connect to based on the listing. In making a decision of which Wi-Fi network to connect, the user typically does not know whether the selected Wi-Fi network will provide adequate quality of service or even if the network will be able to provide an IP address via Dynamic Host Configuration Protocol (DHCP).

Although many applications make increasing use of location information, not all devices include a global positioning system (GPS) or similar hardware. Further, although a device may have a GPS, a sufficient number of satellites may not be available or visible to determine location. For example, a user may be indoors, one or more satellites may be inaccessible, or the GPS signal from the device may be blocked. Further, as devices get smaller and cheaper, GPS hardware with limited capability, flexibility, and communication functionality may hamper retrieval of GPS coordinates.

SUMMARY OF THE INVENTION

Exemplary methods and systems for providing network credentials for network access are described. The exemplary method comprises receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

The method may further comprise decrypting the credential request, authenticating the credential request, and encrypting the credential request response. Further, the method may also comprise retrieving an encryption key based on the digital device. The credential request may be received over a standard protocol of the network device. The standard protocol may be DNS.

The credential request may comprise a location identifier. The method may further comprise receiving a confirmed access response from the digital device.

An exemplary system for providing network credentials may comprise a credential request module and a credential request response module. The credential request module may be configured to receive a credential request from a digital device over a network device. The credential request response module may be configured to identify a network record based on at least some information within the credential request, retrieve a network credential from a plurality of network credentials based on the network record, and transmit a credential request response containing the network to the digital device.

An exemplary computer readable medium may have embodied thereon a program. The program may be executable by a processor for performing a method for providing network credentials. The method may comprise receiving a credential request from a digital device over a network device, identifying a network record based on at least some information within the credential request, retrieving a network credential from a plurality of network credentials based on the network record, and transmitting a credential request response containing the network credential from the plurality of network credentials to the digital device.

Systems and methods for selecting a wireless network are disclosed. In some embodiments, a method comprises receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

In various embodiments, the first network device identifier and the second network device identifier are received from a digital device by a server. The method may further comprise providing a wireless network selection based on the selection. The method may also further comprise providing a credential request response based on the selection.

In some embodiments, the network selection identifier comprises the first network device identifier. The network selection identifier may also comprise a sorted list including the first network device identifier and the second network device identifier wherein the list is sorted based on the attribute analysis of the first attribute and the second attribute. An attribute may comprise a performance metric, a shared indicator, and a service identifier.

The method may further comprise comparing the first attribute and the second attribute to minimum requirements wherein selecting either the first network identifier or the second network device identifier is also based, at least in part, on the comparison of the attributes to the minimum requirements. The method may also further comprise comparing the first attribute and the second attribute to personalized settings wherein selecting either the first network identifier or the second network device identifier is also based, at least in part, on the comparison of the attributes to personalized settings. The method may also further comprise receiving a user identifier and retrieving the personalized settings from a user account based on the user identifier.

In various embodiments, a system comprises a digital device and a server. The digital device may be coupled to a communication network and configured to transmit a first network device identifier for a first network device and a second network device identifier for a second network device over the communication network. The server may also be coupled to the communication network and configured to receive the first network device identifier and the second network device identifier from the digital device, to obtain a first network profile comprising a first attribute, the first network profile based on the first network device identifier, to obtain a second network profile comprising a second attribute, the second network profile based on the second network device identifier, and to select either the first network device identifier or the second network device identifier based on an attribute analysis of the first attribute and the second attribute.

A computer readable storage medium may be configured to store instructions, the instructions comprising a method, the method comprising the steps of receiving a first network device identifier for a first network device and a second network device identifier for a second network device, obtaining a first network profile comprising a first attribute, the first network profile based on the first network device identifier, obtaining a second network profile comprising a second attribute, the second network profile based on the second network device identifier, and selecting either the first network device identifier or the second network device identifier based on an attribute analysis of the first attribute and the second attribute.

In various embodiments, a method comprises scanning, by a digital device, an area for one or more wireless networks, receiving one or more BSSIDs associated with the one or more wireless networks, generating a location request in a DNS protocol formatted message, the location request comprising the one or more BSSIDs, providing the location request, receiving a location response based on the location request, and retrieving at least one location identifier from the location response.

The location response may be formatted as a DNS protocol. The method may further comprise encoding the one or more BSSIDs in the location request and/or decoding the at least one location identifier from the location response. The location request may be provided to a location server on a network using an open port of a network access device. Further, the open port may be port 53. The at least one location identifier may comprise a latitude and a longitude coordinates.

In various embodiments, the method may further comprise providing the at least one location identifier to an application of the digital device. Moreover, the method may further comprise providing GPS coordinates and one or more network device identifiers to a server.

In some embodiments, an exemplary system comprises a scan module, a DNS module and a location module. The scan module may be configured to scan an area for one or more wireless networks and may be configured to receive one or more BSSIDs associated with the one or more wireless networks. The DNS module may be configured to generate a location request in a DNS protocol formatted message, the location request comprising the one or more BSSIDs and to provide the location request. The location module may be configured to receive a location response based on the location request and to retrieve at least one location identifier from the location response.

An exemplary computer readable storage medium may be configured to store instructions. The instructions may comprise a method. The method may comprise the steps of scanning, by a digital device, an area for one or more wireless networks, receiving one or more BSSIDs associated with the one or more wireless networks, generating a location request in a DNS protocol formatted message, the location request comprising the one or more BSSIDs, providing the location request, receiving a location response based on the location request, and retrieving at least one location identifier from the location response.

DETAILED DESCRIPTION OF THE INVENTION

Embodiments of the present invention provide systems and methods for providing network credentials. In exemplary embodiments, a credential server receives a request for network credentials from a digital device at a hotspot. The request may be formatted as a standard protocol which is relayed from the hotspot to the credential server. The credential server may identify a network record based on at least some information contained within the request and transmit network credentials associated with the network record to the digital device. The digital device may receive the network credentials and provide them to network device in order to obtain network access.

In various embodiments, a rules server may identify a preferred network from a plurality of available networks that the digital device may connect based on a variety of network attributes. In one example, a digital device may scan a physical region for available networks and generate a list of available wireless networks. The list may be provided to a rules server which identifies and retrieves a network profile for each wireless network on the list. The rules server may then compare each network profile (e.g., via attributes contained within each profile) to select a preferred network from the list. The rules server may then transmit the wireless network selection to the digital device which may then access the network.

In some embodiments, the digital device accesses the selected wireless network using credentials provided by the credential server. In one example, when the rules server selects the preferred wireless network, the rules server (or another server in communication with the rules server) may simultaneously (or nearly simultaneously) provide a credential request response including network credentials associated with the selected wireless network.

Figure 1:
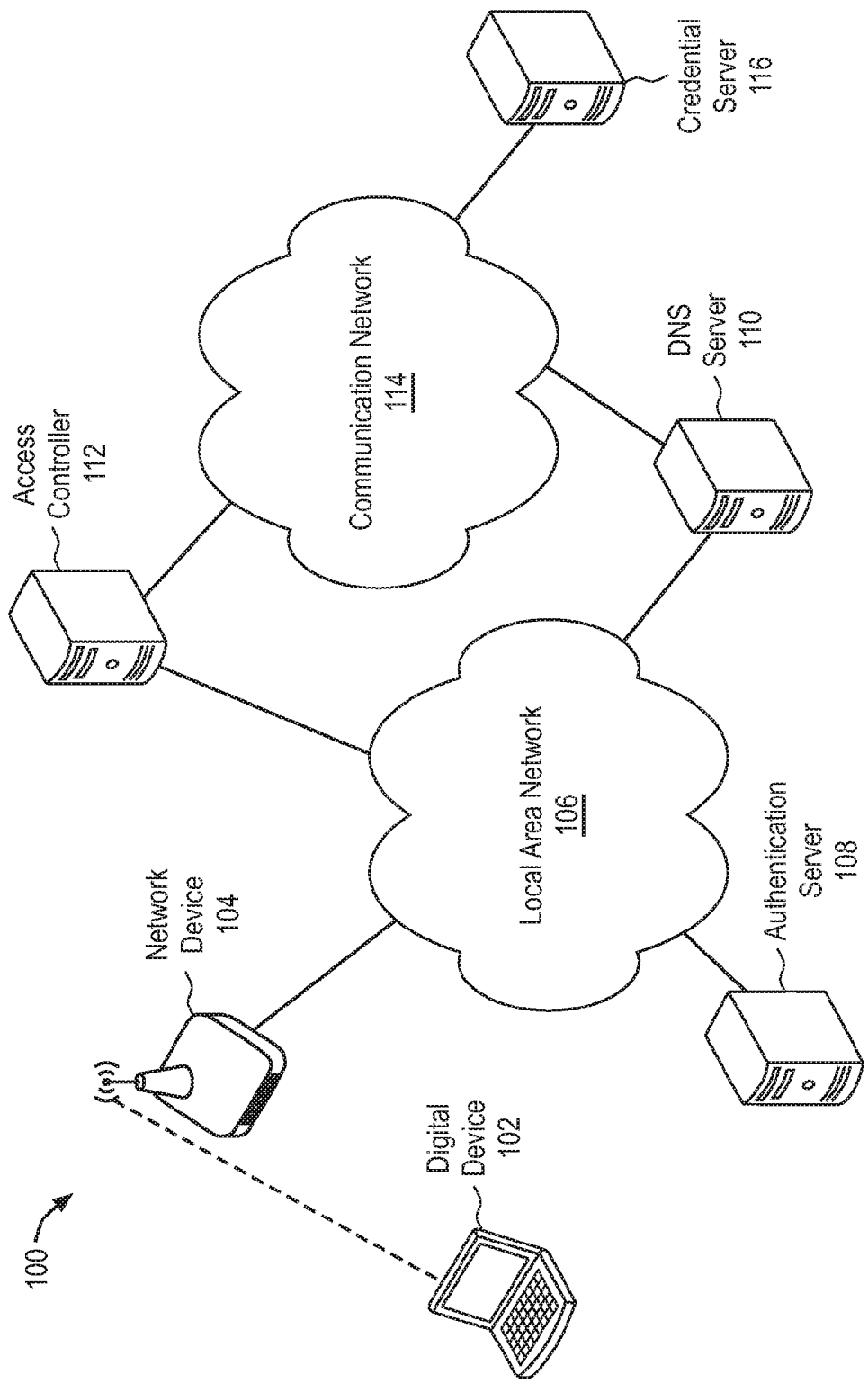
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access the communication network 114. The DNS server 110 provides DNS services over the local area network 106 and may relay DNS requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (e.g., such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request. More details regarding the process for acquiring network credentials are provided in co-pending U.S. patent application Ser. No. 11/899,697, entitled "System and Method for Acquiring Network Credentials," filed Sep. 6, 2007, and incorporated by reference herein.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password, and/or login procedure information. The login procedural information may comprise, for example, HTML form element names, a submission URL, or a submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server. More details regarding the process for obtaining network access are provided in co-pending U.S. patent application Ser. No. 11/899,638, entitled "System and Method for Obtaining Network Access," filed Sep. 6, 2007, and incorporated by reference herein.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
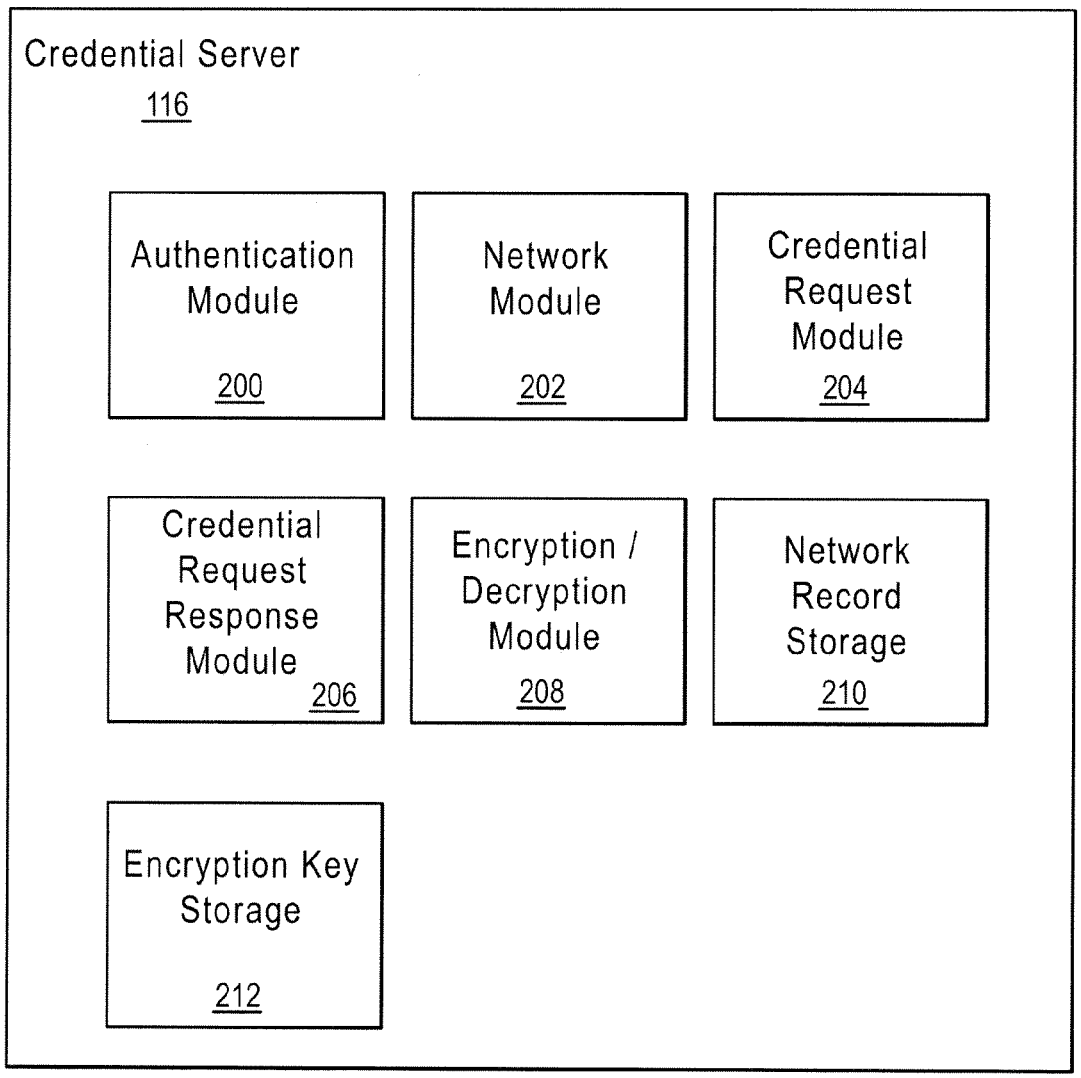
FIG. 2 is a block diagram of an exemplary credential server.

FIG. 2 is a block diagram of an exemplary credential server 116. The credential server 116 comprises an authentication module 200, a network module 202, a credential request module 204, a credential request response module 206, an encryption/decryption module 208, a network record storage 210, and an encryption key storage 212. A module may comprise, individually or in combination, software, hardware, firmware, or circuitry.

The authentication module 200 may be configured to authenticate the credential request and provide security to the credential request response. In various embodiments, the digital device 102 may encrypt or digitally sign the credential request using an encryption key (e.g., a shared encryption key or an encryption key that is a part of a key pair). The authentication module 200 may authenticate the credential request by decrypting the credential request with the proper encryption key retrieved from the encryption key storage 212. In one example, the digital device 102 generates a hash of the credential request and stores the hash within an encrypted portion of the credential request. The authentication module 200 may decrypt the credential request, generate hash of the credential request response, and compare the generated hash to the hash contained within the credential request for authentication.

In other embodiments, the digital device 102 may generate a nonce (i.e., a random value) and store the nonce within a portion of the credential request that is digitally signed. The authentication module 200 may decrypt the digital signature to authenticate the credential request and retrieve the nonce. In various embodiments, when the credential request response module 206 generates the credential request response (described hereafter), the authentication module 200 may include the nonce within the credential request response. The authentication module 200 or the encryption/decryption module 208 may then encrypt the credential request response. When the digital device 102 decrypts the credential request response, the digital device 102 may retrieve the nonce from the credential request response and compare the nonce to the nonce that was transmitted within the credential request for further authentication.

The network module 202 may be configured to receive the credential request and transmit the credential request response over the communication network 114.

The credential request module 204 may receive the credential request from the network module 202. The credential request may be a standard protocol. In one example, the credential request is a UDP protocol (e.g., DNS).

In exemplary embodiments, the credential request module 204 may retrieve the DDID and the SSID from the credential request. The DDID may identify the digital device 102, the user of the digital device 102, and/or the user associated with a network record. The SSID may identify the hotspot or the service provider (i.e., operator) of the hotspot.

The credential request module 204 or the credential request response module 206 may identify a network record based on the DDID and the SSID. A network record is a record associated (either directly or indirectly (e.g., a relational database)) with the DDID and the SSID. In one example, a network record contains network credentials necessary to provide network access to a digital device 102 associated with the DDID at the hotspot associated with the SSID. Network records may be stored within the network record storage 210.

The credential request response module 206 may generate the credential request response. In various embodiments, the credential request response module 206 receives the network credential associated with the DDID and SSID from the network record. In some embodiments, the network credential may comprise a credit card number. In one example, the digital device 102 receives the network credential, retrieves the credit card number, and provides the credit card number to the authentication server 108. In some examples, the authentication server 108 may then charge a fee to a credit card associated with the credit card number or use the information to confirm the identity of the user prior to granting network access.

Further, in various embodiments, the network credentials may comprise login procedural information. In one example, the credentials include a username and password which are to be provided within a form (e.g., an authentication form) retrieved from the authentication server 108 by the digital device 102. In some embodiments, the login procedural information may instruct the digital device 102 to populate specific fields within the form with the network credentials before submitting the completed form to the authentication server 108. Those skilled in the art will appreciate that there are many ways to provide credentials to the authentication server 108. The process of providing the credentials to the authentication server is further discussed in co-pending U.S. patent application Ser. No. 11/899,638, entitled "System and Method for Obtaining Network Credentials," filed Sep. 6, 2007.

The credential request response module 206 or the encryption/decryption module 208 may encrypt the credential request response with an encryption key associated with the DDID or the credential request. In one example, the credential server 116 stores one or more shared encryption keys. Each shared encryption key may be shared by at least one digital device 102. The credential request response module 206 may encrypt the credential request response with the shared encryption key associated with the digital device 102 (e.g., the shared encryption key may be associated with the DDID). The credential request response module 206 or the encryption/decryption module 208 may also encrypt the credential request with an encryption key that is part of a key pair. There may be many ways in which the encryption/decryption module 208 encrypts the credential request.

The encryption/decryption module 208 may decrypt the credential request and encrypt the credential request response. As previously discussed, the encryption/decryption module 208 may decrypt the digital signature of the credential request. In one example, the encryption/decryption module 208 decrypts the digital signature based on an encryption key that is associated with the DDID contained within the credential request. The encryption/decryption module 208 may also encrypt the credential request response. In one example, the encryption/decryption module 208 encrypts the credential request response based on an encryption key associated with the DDID (e.g., a shared encryption key or an encryption key that is part of a key pair).

In various embodiments, the encryption/decryption module 208 may encrypt the network records contained within the network record storage 210 and manage the encryption key storage 212. The encryption/decryption module 208 may also establish secure communications (e.g., via SSL and HTTPS) with a digital device when storing network credentials. This process is further described in FIG. 7. In accordance with some embodiments, the encryption/decryption module 208 may be optional.

The network record storage 210 and the encryption key storage 212 may store network records and encryption keys, respectively. The network record storage 210 and the encryption key storage 212 may comprise one or more databases. In one example, the network record storage 210 may store network records. A network record may comprise a DDID, SSID, and network credentials. The network record may also comprise a username and password for the user to access, alter, update, or store network records within the credential server 116.

In various embodiments, the network record may also allow multiple digital devices 102 to use the same network credentials. In one example, the user may own multiple digital devices 102. Multiple DDIDs, each DDID associated with a different digital device 102, may be included in the same network record. In some embodiments, multiple devices may be associated with one or more network records, and the one or more network records are associated with a user. As a result, the user may retrieve the network credentials for a hotspot using any number of digital devices 102. Those skilled in the art will appreciate that there are many ways in which the network records and/or the information contained therein may be stored and organized (e.g., different data structures, databases, records, organizing schemes, and/or methodologies).

Figure 3:
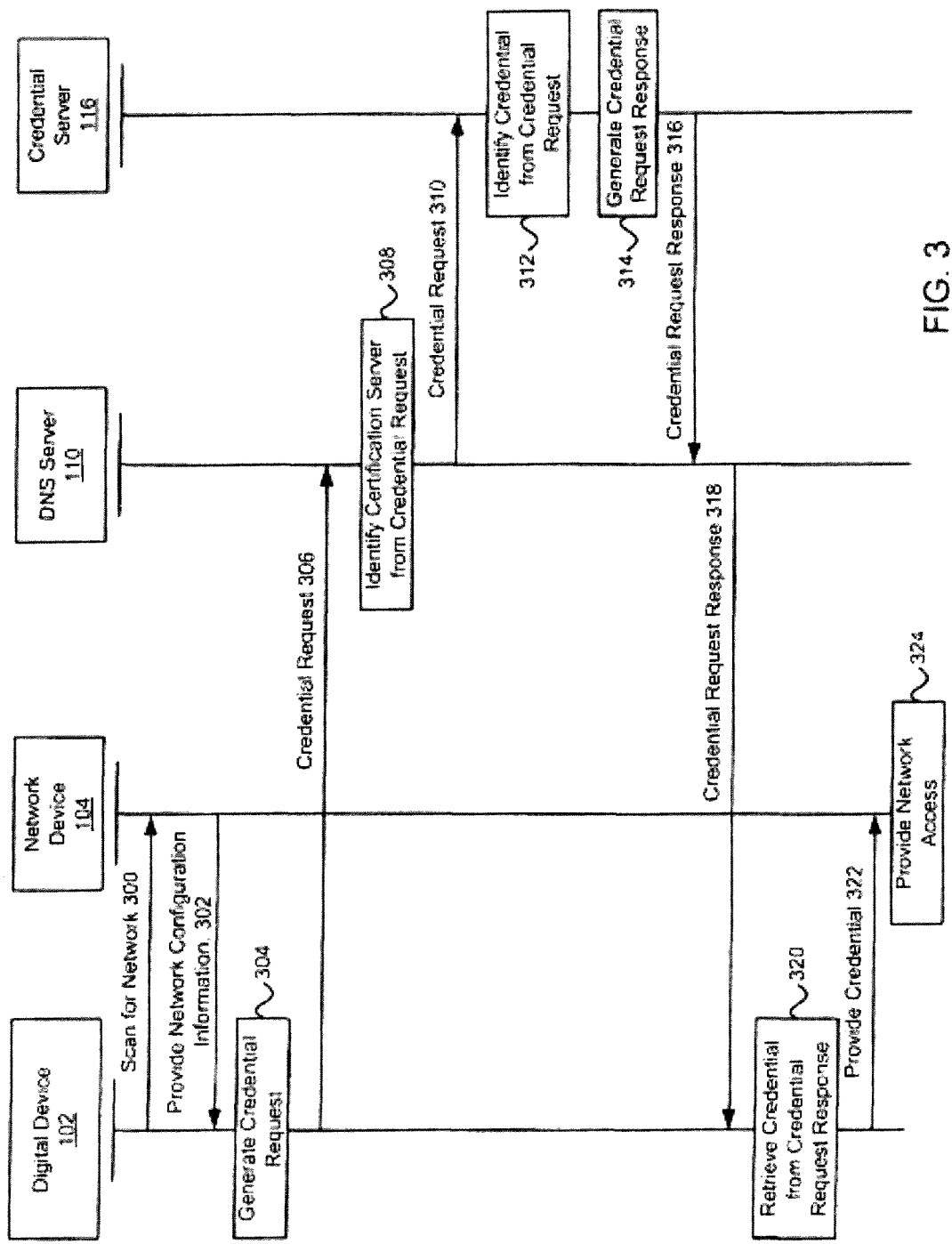
FIG. 3 is a flow diagram of an exemplary process for providing network access to the digital device.

FIG. 3 is a flow diagram of an exemplary process for providing network access to the digital device 102. When the digital device 102 first enters into a hotspot, the digital device 102 may scan for the local area network 106 in step 300. As a result of the scan, the network device 104 may provide network configuration information in step 302. The network configuration information may comprise one or more IP addresses for access to the DNS server 110.

In step 304, a credential request is generated by the digital device 102. Subsequently, the credential request may be sent to the DNS server 110 in step 306 using one of the IP addresses previously received from the network device 104.

Based on the credential request, the credential server 116 is identified by the DNS server 110 in step 308. In other embodiments, the DNS server 110 forwards the credential request to the credential server 116. When the DNS server 110 is unable to locally resolve the DNS request, the credential request is forwarded to another DNS server on the communication network 114 (e.g., over port 53) which may then forward the credential request to the credential server 116. The credential request is forwarded, either directly or indirectly through one or more other DNS servers on the communication network 114, to the credential server 116 in step 310.

The credential server 116 identifies the network credential needed based on the credential request in step 312. For example, the credential request may comprise an identifier (i.e., the DDID) for the digital device 102 as well as an identifier for the hotspot SSID (e.g., the service provider such as an operator). The identifiers may be compared against a table (e.g., network record) of such identifiers by the credential request module 204 or the credential request response module 206 to determine the proper network credential. A credential request response is then generated by the credential request response module 206 in step 314 and relayed back to the DNS server 110 in step 316. The DNS server 110 forwards the credential request response back to the digital device in step 318.

The digital device 102 may then retrieve the network credentials from the credential request response in step 320. The network credential may then be provided to the network device 104 in step 322. Upon verifying the network credentials, the network device 104 provides network access to the digital device 102 in step 324.

Figure 4:
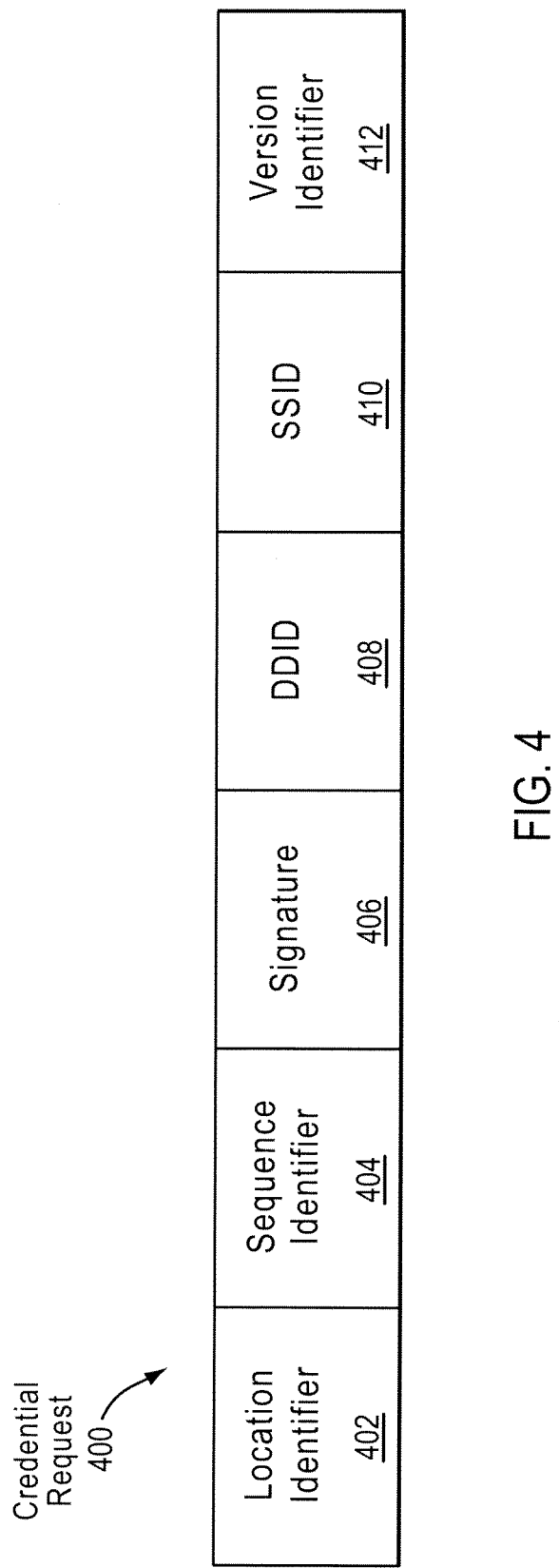
FIG. 4 is a block diagram of an exemplary credential request.

Referring now to FIG. 4, an exemplary credential request 400 is shown in more detail. According to exemplary embodiments, the credential request module 204 may generate the credential request 400. In one embodiment, the credential request 400 may be a DNS string having a structure that comprises a location identifier 402, a sequence identifier 404, a signature 406, the DDID 408, a service set identifier (SSID) 410, and a version identifier 412.

The optional location identifier 402 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 404 may comprise any number or set of numbers used to correspond to a subsequent request to the credential server 116 to determine if the login is successful. That is, the sequence identifier 404 provides a correlation mechanism by which verification of the login process may be made by the credential server 116.

In exemplary embodiments, the signature 406 comprises a cryptographic signature (i.e., digital signature) that is utilized to prevent spoofing. The signature 406 of the request from digital device 102 is verified by the credential server 116. If the signature 406 is not valid, then the request is rejected by the credential server 116.

The DDID 408 comprises an identifier of the digital device 102. For example, the DDID 408 may comprise a MAC address or any other identifier of the digital device 102.

The SSID 410 comprises an identifier of the network access point or Wi-Fi service provider. For example, the SSID 410 may comprise the name of the service provider or the name of the venue operating the network device 104.

The version identifier 412 may identify the protocol or format of the credential request 400. For example, a digital device 102 may generate the credential request 400 and organize the data in a number of different formats. Each different format may be associated with a different version identifier. In some embodiments, the components of the credential request response module 206 may be updated, reconfigured, or altered over time, which may affect the structure of the credential request 400. As a result, the credential server 116 may receive a plurality of credential requests 400 which are formatted differently. The credential server 116 may access the required information from each credential request based on the respective version identifier.

Figure 5:
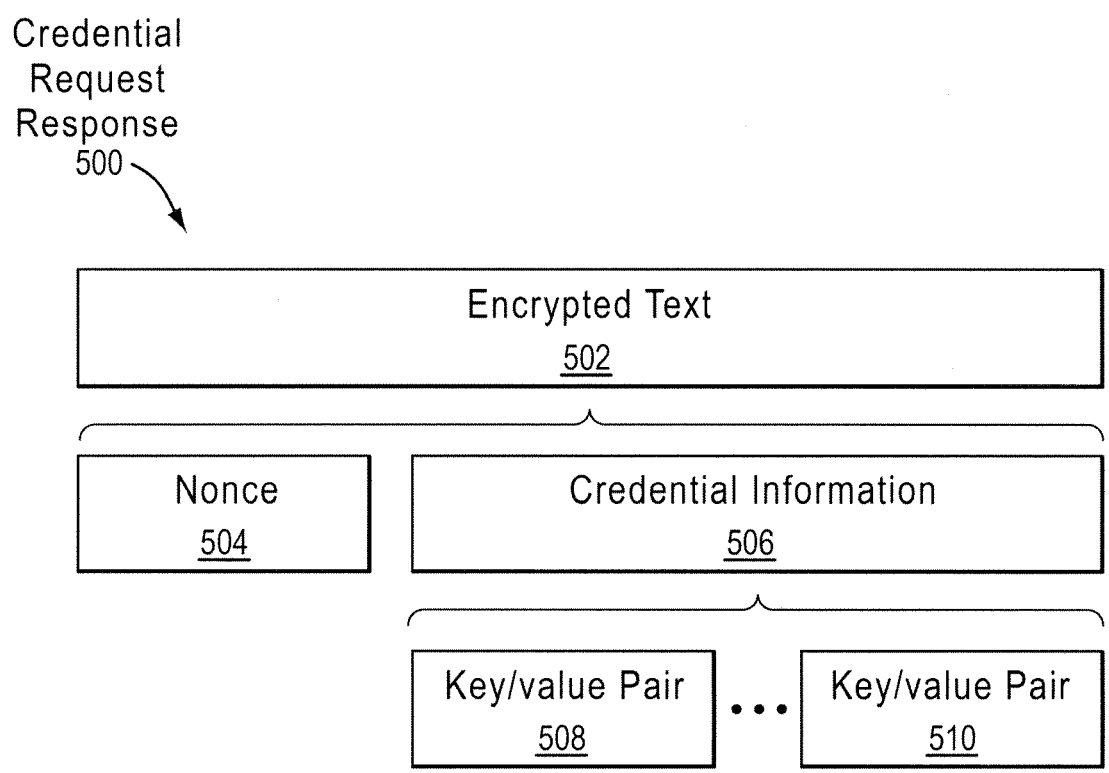
FIG. 5 is a block diagram of an exemplary credential request response.

FIG. 5 is a block diagram of an exemplary credential request response. According to exemplary embodiments, the credential request response module 206 may generate the credential request response 500. In one embodiment, the credential request response 500 may comprise encrypted text 502. The encrypted text may comprise an optional nonce 504 and credential information 506. The credential information may comprise key/value pairs 508 through 510.

As previously discussed, the credential request response may be formatted as a DNS response comprising encrypted text 502. The encrypted text 502 includes the network credentials (e.g., username, password, and login procedure information). Although the credential request response 500 is depicted as including encrypted text 502, the text within the credential request response 500 need not be encrypted.

The encrypted text 502 may comprise the nonce. The nonce, as previously discussed, may be retrieved from the credential request. Once the credential request response 500 is received by the digital device 102, the digital device 102 may compare the nonce within the credential request response 500 to the nonce transmitted within the credential request for authentication. Although the nonce is depicted as within the credential request response 500 in FIG. 5, the nonce is optional.

The credential information 506 may comprise a username, password, login procedure information, or a combination of these. The credential information 506 may comprise key/value pairs 508 through 510. Any number of key/value pairs may be within the credential information 506. The key/value pairs may represent the credential information to be received and translated by the digital device 102. The credential information 506 is depicted as key/value pairs for exemplary purposes only; the credential information may be within any format not necessarily limited to key/value pairs.

Figure 6:
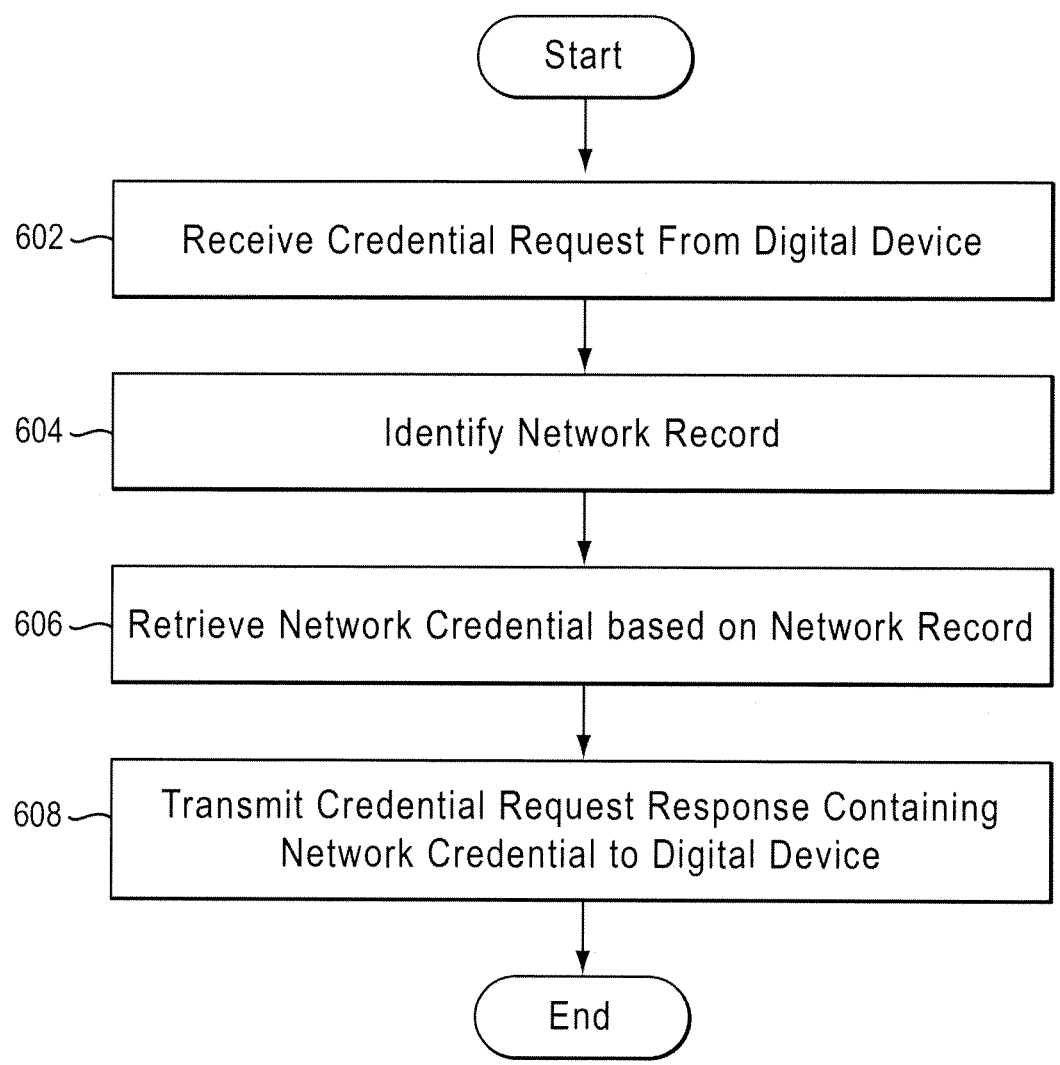
FIG. 6 is a flow diagram of the exemplary method for providing network credentials.

FIG. 6 is a flow diagram of the exemplary method for providing network credentials. In step 602, the credential server 116 receives the credential request from the digital device 102.

In various embodiments, the credential server 116 decrypts and authenticates the digital signature with an encryption key. The credential server 116 may then identify a network record based on the DDID and the SSID contained within the network record in step 604. In one example, the credential request response module 206 retrieves one or more network records associated with the DDID within the credential request. The credential request response module 206 then identifies at least one network credential associated with the SSID within the retrieved network record(s).

In step 606, the credential request response module 206 retrieves the identified network credential(s) from the selected network record. In one example, the credential request response module 206 identifies a username and password that the user of the digital device 102 must provide to the authentication server 108 to obtain network access. The credential request response module 206 generates the credential request response comprising the network credentials (e.g., username, password) to the digital device 102 in step 608.

In some embodiments, the credential request response module 206 may identify login procedural information as part of the network credentials. The credential request response module 206 may retrieve the login procedural information from the network record (e.g., the same network record containing a password associated with the SSID). The login procedural information may contain a form identifier and instructions (e.g., parameters) for the digital device 102 to follow to obtain network access. In one example, the digital device 102 retrieves the form identifier and instructions from the network credential within the credential request response. The digital device 102 may identify forms received from the authentication server 108 and input data based on the form identifier and instructions. In another example, the digital device 102 provides information to the authentication server 108 to obtain network access based on the login procedural information included within the credential request response. The process of providing information to the authentication server 108 is further described in U.S. patent application Ser. No. 11/899,638 entitled "Systems and Methods for Obtaining Network Access", filed Sep. 6, 2007.

Figure 7:
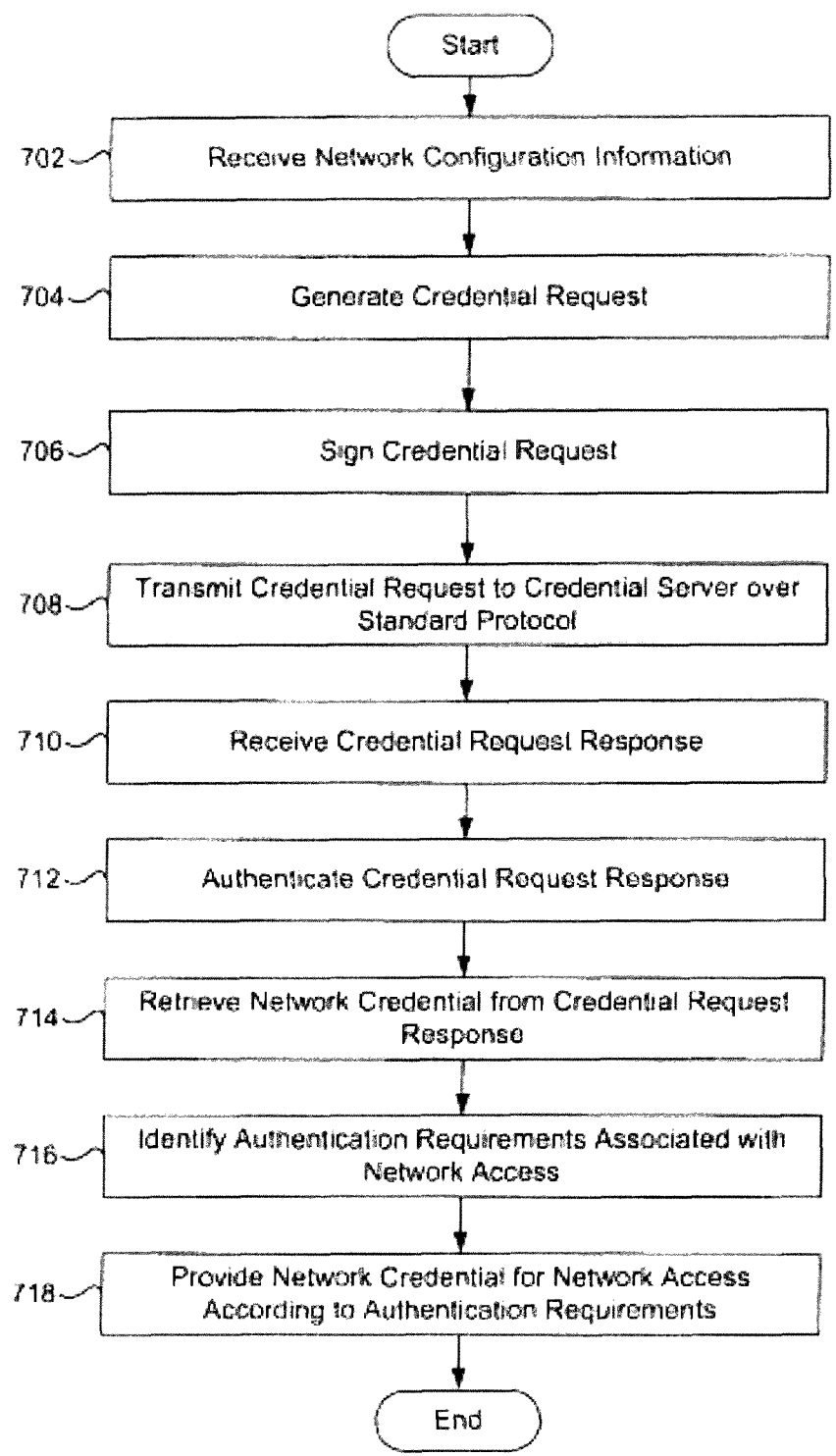
FIG. 7 is another flow diagram of the exemplary method for providing network credentials.

FIG. 7 is another flow diagram of the exemplary method for providing network credentials. The digital device 102 may search and find an available wireless network via the network device 104. While connecting to the hotspot, the digital device 102 may receive network configuration information in step 702. Network configuration information may comprise an identifier for the network device 104, or the DNS server 110. In one example, the digital device 102 receives a DNS server IP address (e.g., for the DNS server 110) during the connection process.

In step 704, the digital device 102 generates the credential request. The credential request may comprise a sequence identifier, DDID, and SSID. In step 706, the digital device 102 optionally generates a nonce and digitally signs the credential request with an encryption key. The digital device 102 transmits the credential request as a standard protocol in step 708. The network device 104 may receive and forward the credential request to the communication network 114. In various embodiments, the network device 104 may provide the credential request to the DNS server 110 which may forward the credential request to the credential server 116.

In exemplary embodiments, the credential request module 204 of the credential server 116 receives the credential request. The credential request module 204 may retrieve an encryption key associated with the DDID within the credential server from the encryption key storage 212. The credential request module 204 may then decrypt the digital signature of the credential request for authentication. The credential request module 204 may further retrieve the nonce and a sequence identifier from the credential request.

The credential request response module 206 of the credential server 116 may then retrieve a network record associated with the DDID and the SSID from the network record storage 210. The credential request response module 206 retrieves network credentials from the network record and generates the credential request response. The credential request response may comprise the network credentials and the nonce. The encryption/decryption module 208 may encrypt the credential request response with an encryption key associated with the DDID retrieved from the encryption key storage 212. In some embodiments, the credential request response is formatted as a standard protocol (e.g., DNS).

In step 710, the digital device 102 receives the credential request response. The digital device 102 subsequently authenticates the credential request response in step 712. In one example, the digital device 102 decrypts the credential request response with the same encryption key used to digitally sign the credential request. The digital device 102 may further retrieve the nonce within the credential request response and compare the nonce to the nonce transmitted within the credential request for further authentication. If the credential request response is found to be authentic, the digital device 102 retrieves the network credentials from the credential request response in step 714.

In step 716, the digital device 102 identifies the authentication requirements associated with network access. In various embodiments, the digital device 102 determines the correct information and network credentials to provide to the authentication server 108. In one example, the digital device 102 retrieves one or more network access pages from the authentication server 108. The digital device 102 may access the correct network access page from the authentication server and automatically make selections. In one example, the digital device 102 may automatically activate selections (e.g., activate buttons within the network access page, check boxes, and select radio buttons).

For example, the credential request response module 206 may provide instructions to the digital device 102 for the automatic selections within a network access page. As discussed herein, a network access page may comprise one or more web pages, one or more tags, or a combination of both retrieved from the authentication server 108. In one example, software within the digital device 102 may automatically check all selection boxes within a network access page. The digital device 102 may then uncheck select boxes based on the login procedure information. Those skilled in the art will appreciate that there may be many methods with which selections may automatically be made. In other embodiments, the digital device 102 receives XML tags from the authentication server 108. The digital device 102 may provide information based on the XML tags and instructions within the login procedural information to the authentication server 108 to obtain network access.

In step 718, the digital device 102 provides the network credential to the network device 104 to obtain network access to the communication network 114. In one example, the credential request response module 206 retrieves one or more forms from the authentication server 108, populates the forms with one or more network credentials, and provides the completed forms to the authentication server 108. In another example, the credential request response module 206 provides the network credentials as needed to the authentication server 108. Once the network credentials are received by the authentication server 108, the authentication server 108 may allow communication between the digital device 102 and the communication network 114. In one example, the authentication server 108 commands the access controller 112 to allow the digital device 102 access to the communication network 114.

The digital device 102 may subsequently test network connectivity to confirm network access. In one example, the digital device 102 transmits a request to the credential server 116 to determine if the communication network 114 is available. In some embodiments, the query or command contains the sequence identifier previously submitted within the credential request. If network access is successful, the credential server 116 may receive the request and retrieve the sequence identifier. The credential server 116 may then confirm that network access was successful.

Figure 8:
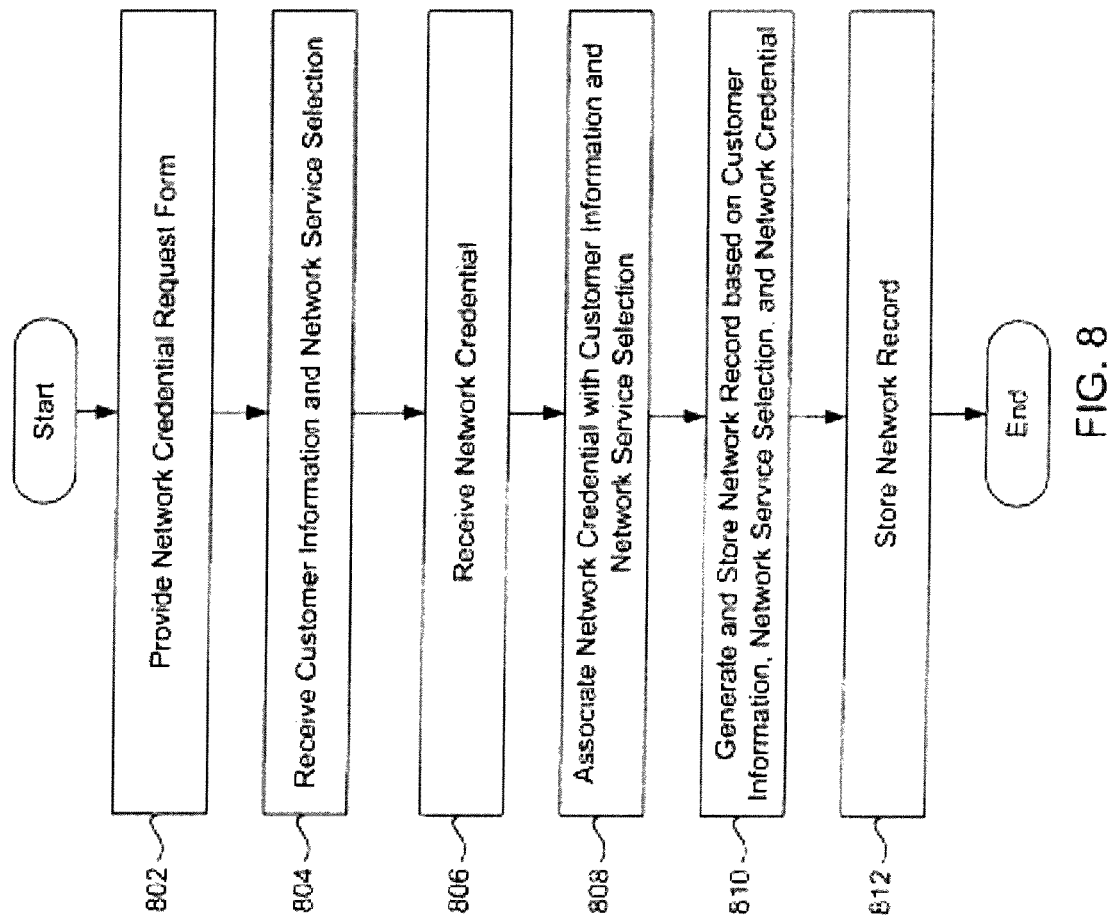
FIG. 8 is a flow diagram of an exemplary method for receiving and storing network credentials.

FIG. 8 is a flow diagram of an exemplary method for receiving and storing network credentials. In various embodiments, users may create and store network records within the credential server 116. For example, the credential server 116 may comprise a credential storage module (not depicted) that provides a graphical user interface (GUI) that allows users to create, store, update, remove, and modify network records.

In step 802, the credential server 116 provides the user with a network credential request form. In one example, the credential server 116 provides the network credential request form to a user as one or more web pages over the Internet. The network credential request form is configured to receive the service provider's name (e.g., operator's name) and/or SSID and network credentials.

The service provider's name may comprise the name of the entity that operates the hotspot, one or more components related to the hotspot (e.g., the network device 104), or the infrastructure of the local area network 106. In some embodiments, the service provider's name comprises the name of an organization that manages one or more hotspots for another service provider. In one example, a coffee shop and bookstore may both use a third-party manager to manage the hotspots, even if the hotspots have different service providers. In some embodiments, the network credential request form may be configured to receive the third-party manager's name. In some embodiments, the service provider's name comprises the name of an organization that resells access to a hotspot network (e.g., an aggregator).

The network credential request form may also receive the SSID as a network service selection. In one example, the network credential request form comprises a pull down menu of different service providers and/or hotspots that the user may select. For example, a user may select "Starbucks" or "San Francisco International Airport" as a hotspot. The user may be given further options to such as geographic locations of the hotspot. The user may also select the service provider. For example, the user may select "T-Mobile" as a service provider. The network credential request form may then allow the user to select among one or more various hotspots associated with T-mobile. The selection(s) may then be stored as a network record. Alternately, a network service identifier associated with the selection(s) is generated as the SSID.

Further, the network credential request form may receive the network credential from the user. For example, the user may enter a username, password, passcode as network credentials within the network credential request form. In some embodiments, after the network credential request form receives the SSID, the network credential request form determines the type of network credentials required. For example, the network credential request form identifies the information required to access a network at a hotspot at the San Francisco International Airport previously selected by the user. The network credential request form then generates fields or selections to allow the user to enter only the information necessary (e.g., username, password) to obtain network access at the hotspot.

The credential server 116 may also require the user to register prior to receiving the network credential request form. During registration, the user may be required to agree to terms of service and enter customer information. Customer information comprises a username and a password to access the credential server 116 to store network credentials. Optionally, the customer information may comprise the user's address, contact information, and payment options for the user to use services offered by the credential server 116.

In step 804, the credential server 116 receives the customer information and network service selections over the network credential request form. In step 806, the credential server may retrieve the network credential. In step 808 the credential server 116 receives the customer information. The credential server 116 associates the network credential with the customer information, network service selection and network credential(s) in step 810 to create a network record. The network record is then stored in step 812.

In some embodiments, the user may manually access the credential server 116 via the Internet. In other embodiments, the user may download and install network credential software on the digital device 102. The network credential software may identify and send the DDID of the digital device 102 to the credential server 116. In other embodiments, the network credential software may be pre-installed on the digital device 102. When the digital device 102 first activates the network credential software, the network credential software may identify and send the DDID of the digital device 102 to the credential server.

The user may input the SSID (e.g., identify the service provider or hotspots) into the network credential software. The user may also input the network credentials within the network credential software. After the network credential software has obtained the DDID, SSID, and network credentials, the network credential software may upload the information to the credential server 116 which stores the information within a network record. In various embodiments, the network credential software may be downloaded from the credential server 116.

Figure 9:
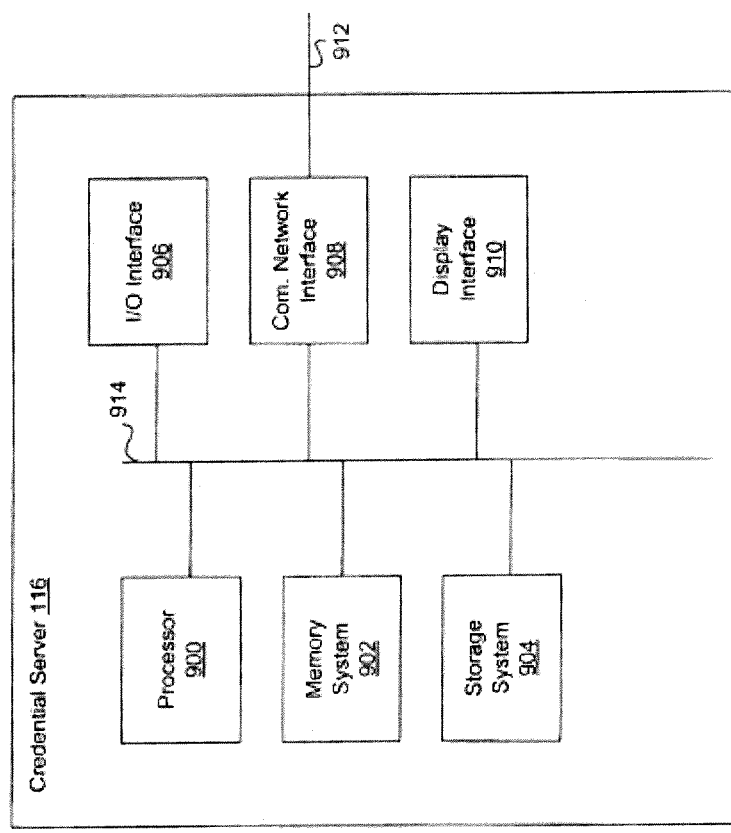
FIG. 9 is a block diagram of an exemplary credential server.

FIG. 9 is a block diagram of an exemplary digital device. The credential server 116 comprises a processor 900, a memory system 902, a storage system 904, an I/O interface 906, a communication network interface 908, and a display interface 910. The processor 900 is configured to execute executable instructions (e.g., programs). In some embodiments, the processor 900 comprises circuitry or any processor capable of processing the executable instructions.

The memory system 902 is any memory configured to store data. Some examples of the memory system 902 are storage devices, such as RAM or ROM. The memory system 902 can comprise the ram cache. In various embodiments, data is stored within the memory system 902. The data within the memory system 902 may be cleared or ultimately transferred to the storage system 904.

The storage system 904 is any storage configured to retrieve and store data. Some examples of the storage system 904 are flash drives, hard drives, optical drives, and/or magnetic tape. In some embodiments, the credential server 116 includes a memory system 902 in the form of RAM and a storage system 904 in the form of flash data. Both the memory system 902 and the storage system 904 comprise computer readable media which may store instructions or programs that are executable by a computer processor including the processor 900.

The optional input/output (I/O) interface 906 is any device that receives input from the user and output data. The optional display interface 910 is any device that is configured to output graphics and data to a display. In one example, the display interface 910 is a graphics adapter. It will be appreciated that not all digital devices 102 comprise either the I/O interface 906 or the display interface 910.

The communication network interface (com. network interface) 908 can be coupled to a network (e.g., the local area network 106 and communication network 114) via the link 912. The communication network interface 908 may support communication over an Ethernet connection, a serial connection, a parallel connection, or an ATA connection, for example. The communication network interface 908 may also support wireless communication (e.g., 802.11 a/b/g/n, WiMax). It will be apparent to those skilled in the art that the communication network interface 908 can support many wired and wireless standards.

In various embodiments, systems and methods are described that enable a digital device to automatically select and access an available wireless network from a plurality of available wireless networks based on rules to achieve a satisfactory quality of service. Such rules could be implemented in the digital device itself, on a server in communication with the digital device, or a combination of both. In various embodiments, a wireless network is a network that allows wireless access between a digital device and a communication network such as the Internet.

In accordance with some embodiments, a user of a wireless digital device (e.g., digital device capable of Wi-Fi communication) creates an account on a web server and registers one or more digital devices (e.g., computers, laptops, personal digital assistants, and cell phones) with that account. The registered digital devices can be managed and a network record provisioned by a central server (e.g., a profile server or a credential server) via a network communication mechanism, such as HTTP.

Figure 10:
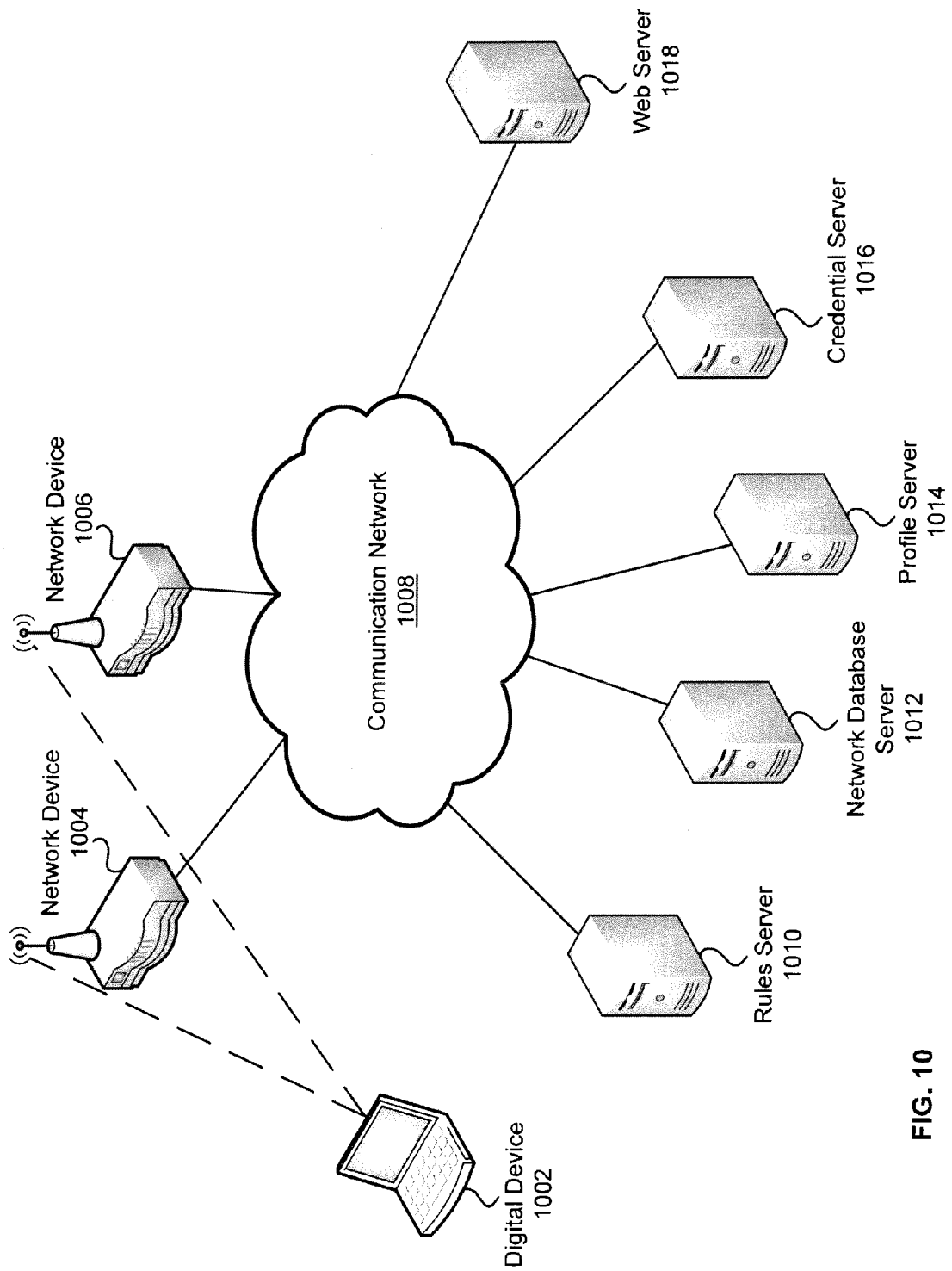
FIG. 10 is a diagram of another environment in which embodiments of the present invention may be practiced.

FIG. 10 is a diagram of another environment in which embodiments of the present invention may be practiced. In various embodiments, a user with a digital device 1002 enters an area located near the network devices 1004 and 1006. In one example, the network devices 1004 and 1006 are separate access points which may each be used to establish communication between the digital device 1002 and the communication network 1008.

The digital device 1002 may scan the area surrounding the digital device 1002, detect the two network devices 1004 and 1006, and generate a list of available wireless networks with which the digital device 1002 may establish communication. In some embodiments, the list of available wireless networks comprises DDID, SSID, and/or BSSID identifiers of the network devices 1004 and 1006.

Subsequently, the digital device 1002 provides the list of available wireless networks to a rules server 1010. In one example, the digital device 1002 provides the list of available wireless networks as a standard protocol over an open port of either the network device 1004 or the network device 1006 to the communication network 1008 and, ultimately, to the rules server 1010. In another example, the digital device 1002 provides the list of available wireless networks over another network such as a cellular communication network (e.g., via CDMA, GSM, 3G, or EVDO) or other wireless network (e.g., Wi-Fi, Wimax, or LTE network) not depicted.

The rules server 1010 receives the list of available wireless networks and may retrieve a network profile for each wireless network identified within the list. A network profile is a record that is associated with a wireless network and comprises attributes concerning performance and/or quality of service provided by the associated network. In one example, the rules server 1010 identifies each network within the list and provides the SSID and/or BSSID for each network to the profile server 1014. The profile server 1014 may then provide a network profile (based on the SSID and/or BSSID) for each network to the rules server 1010. In some embodiments, the profile server 1014 retrieves the network profile from a database or other server (e.g., network database server 1012).

The rules server 1010 may select a preferred wireless network from the list of available wireless networks based on attributes within the network profiles and/or any attributes received from the digital device 1002. An attribute is a characteristic of a wireless network. In various embodiments, an attribute includes a performance metric, a shared indicator, or a service identifier. A performance metric of a wireless network is any measure of network performance. In some examples, a performance metric may comprise a latency metric, a bandwidth metric, or a quality of service (QOS) metric. Those skilled in the art will appreciate that a performance metric may include any type of metric that represents performance of a wireless network.

A latency metric is a measurement that represents time to send a packet of data from the digital device to a server on a network. In some embodiments, the digital device 1002 may send an ICMP "echo request" packet to a server and listen for an ICMP "echo response" reply. The latency metric may comprise an estimate of the round-trip time (generally in milliseconds) and/or include any packet loss. In another example, the latency metric is half of the estimated round-trip time.

A bandwidth metric is a measurement of the available bandwidth of a wireless network. In one example, the digital device may test available bandwidth by sending a block of data over the wireless network to a server and timing the response.

A QOS metric is any metric that measures the quality of service of the wireless network, the access device 1004, the access device 1006, and/or the communication network 1008. In one example, the QOS metric represents a reliability of the DHCP which is determined by timing the length of time required to get an IP address. The reliability of the DHCP may comprise a statistical measurement, a probability of receiving an IP address at all, and/or a distribution of time.

A shared indicator indicates if a wireless network is shared. In some embodiments, the shared indicator may be one of three states including "shared," "not shared," and "unknown". Although the shared indicator may only include a single state (e.g., "not shared"), those skilled in the art will appreciate that the shared indicator can have any number of states. A wireless network with a shared indicator that indicates that the network is "shared" may indicate that the owner of the wireless network intends for others to use the network. One example of a "shared" network may include a wireless network which is intentionally "open" (e.g., unencrypted) for others to use.

A wireless network with a shared indicator that indicates that the network is "not shared" may indicate that the owner of the wireless network does not desire anyone who does not have express permission to access the network. In one example, wireless networks that are not shared are often intentionally encrypted (e.g., through WEP or WPA) so as to limit access to unauthorized users. Not all networks that are "not shared," however, are encrypted. For example, the owner of the network may misconfigure the network device or, through error, allows a network to be open (i.e., unencrypted) even though the network is not intended to be shared.

A wireless network with a shared indicator that indicates that the network is "unknown" may indicate that the wireless network may either be "shared" or "not shared." For example, the intent of the owner of an open network may not be known.

A service identifier may identify one or more services supported by the wireless network. In one example, one or more service identifiers indicate that a wireless network supports VOIP, teleconferencing, and/or video conferencing. The service identifier may identify any kind of service supported by the wireless network. In some embodiments, the service identifier may identify services that are not supported by the wireless network.

Those skilled in the art will appreciate that the network profile may comprise any number of attributes. Further, those skilled in the art will appreciate that the network profile may comprise only one or more performance metrics, only one shared indicator, or only one or more service identifiers.

In various embodiments, the rules server 1010 selects one or more wireless networks from the list of available wireless networks based on the attribute analysis. In one example, the rules server 1010 applies rules to the attributes. The rules may comprise minimum requirements, personalized settings, and attribute comparisons. In one example, the rules applied by the rules server 1010 may compare the attributes of one or more wireless networks to one or more minimum requirements. If the attributes for a wireless network are below the minimum requirements, then the wireless network may not be selected or removed from the list of available wireless networks.

In some embodiments, the rules applied by the rules server 1010 may be based on personalized settings by the user. For example, the user of the digital device 1002 may indicate personalized settings that indicate that the digital device 1002 is only to connect over wireless networks that have been designated as "shared." In this example, the rules server 1010 may select only those wireless networks with an attribute that comprises a shared indicator that identifies the wireless network as "shared."

In various embodiments, the rules applied by the rules server 1010 may be based on a comparison of the attributes of one wireless network to another. In one example, the attributes may indicate that one wireless network has a greater bandwidth and shorter latency than another. In this example, the rules server 1010 may select one wireless network that has better performance or valuable services in comparison to another. Those skilled in the art will appreciate that there may be any kind of rule used to select or to assist in the selection of a wireless network from the list of available wireless networks.

More than one rule may be applied by the rules server 1010 in making the wireless network selection. In one example, the rules server 1010 may apply personalized settings of the user before comparing attributes from different wireless networks and making a selection. In another example, the rules server 1010 may apply minimum requirements to the attributes before comparing the attributes.

Once the rules server 1010 selects the wireless network based on the comparison of attributes from the network profiles, the rules server 1010 may provide the wireless network selection to the digital device 1002. A wireless network selection includes one or more identifiers (e.g., network identifiers) that identify at least one wireless network. The wireless network selection may identify a single wireless network or comprise a sorted list of wireless networks which is sorted in order of preference.

In some embodiments, the rules server 1010 provides credentials (e.g., a credential request response) for the selected wireless network in addition to the wireless network selection to the digital device 1002. In one example, the rules server 1010 provides the selected wireless network to the credential server 1016 which then provides a credential request response (even though no credential request has been made) for the selected wireless network to the digital device 1002. In other embodiments, the digital device 1002 receives the wireless network selection and then proceeds to transmit a credential request to the credential server 1016 to receive the credentials as discussed herein.

Further, in various embodiments, the digital device 1002 attempts to establish a connection based on the selected wireless network. If the connection fails, the digital device 1002 may transmit a credential request to the credential server 1016 to retrieve credentials for network access as described herein. The digital device 1002 may provide the credential request to the credential server 1016 over an open port of the network device 1004. In another example, the digital device 1002 may provide a credential request over any other network including a connection with a different network device or over a cellular connection.

Although the rules server 1010, network database server 1012, profile server 1014, the credential server 1016, and the web server 1018 are depicted as separate servers in FIG. 1, the servers may all be combined as one or more servers. Similarly, the functions of any of the servers may be performed by one of the other servers depicted or any other server.

Although FIG. 10 depicts multiple servers (e.g., rules server, network database server, profile server, credential server, and web server) for performing the selection of a wireless network from the plurality of available wireless networks, it will be appreciated by those skilled in the art that the selection of the wireless networks may occur within the digital device 1002. In one example, the digital device 1002 retrieves the scan results listing available wireless networks and selects a wireless network based on configuration preferences. The configuration preferences may be based on one or more locally executed rules, preferred signal strength, or any other attribute or attributes. In another example, the digital device 1002 selects a wireless network that supports a desired service (e.g., VOIP), meets a minimum latency standard, and meets a minimum QOS standard. In another example, the profile server 1014 provides the desired network profiles to the digital device 1002 which performs the analysis to determine the preferred wireless network.

Figure 11:
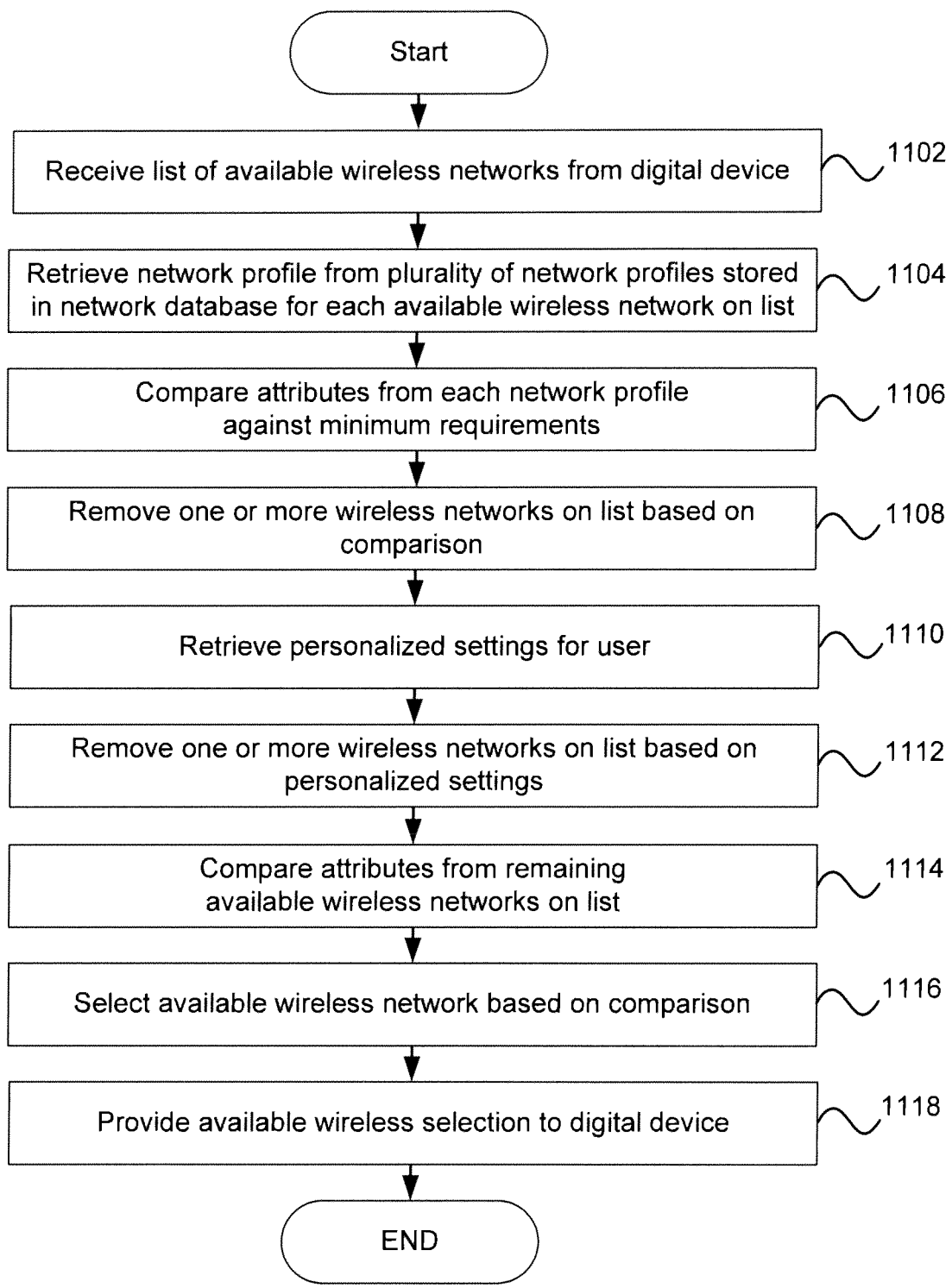
FIG. 11 is a flow diagram of an exemplary process for providing a selection of a wireless network.

FIG. 11 is a flow diagram of an exemplary process for providing a selection of a wireless network. In step 1102, a server (e.g., rules server 1010, network database server 1012, profile server 1014, credential server 1016, or web server 1018) receives a list of available wireless networks from the digital device 1002. In some examples, the list comprises the SSIDs or BSSIDs of one or more network devices (e.g., network device 1004 and network device 1006). The list can comprise any information that identifies a network and/or network device.

In some embodiments, the server also receives one or more attributes associated with a network and/or network device. In various embodiments, the digital device 1002 measures signal strength, determines available services, or takes a performance metric for one or more networks and/or network devices that are identified on the list of available wireless networks.

In step 1104, the server retrieves a network profile from a plurality of network profiles stored in a network database for each available wireless network on the list of available wireless networks. Each network profile may comprise at least one attribute. In some embodiments, not all wireless networks on the list have a network profile. When a network profile for a wireless network on this list is not found, a network profile associated with the wireless network may be then created. If attributes are received from the digital device 1002, the server may determine which attribute received from the digital device 1002 is associated with which network, network device, and/or network profile.

In step 1106, the server compares attributes from each network profile against minimum requirements. In one example, the server compares latency metrics from all network profiles in the list (if available) against a minimum latency metric. The server may also compare attributes received from the digital device 1002 against the minimum requirements. In step 1108, the server removes one or more wireless networks from the list of available wireless networks and/or wireless network profiles based on the comparison(s). For example, any wireless network with a latency metric that falls below the minimum latency metric may not be selected. In other embodiments, a wireless network with a latency metric that falls below the minimum latency metric may receive a weighted value that will be compared to other wireless networks to assist in the selection process.

In some embodiments, the user of the digital device 1010 determines the minimum requirements. In other embodiments, the minimum requirements may be selected for the user (e.g., by an administrator).

In step 1110, the server retrieves personalized settings for a user. The personalized settings may be sent by the user to the server. In some embodiments, the user has an account with the web server 1018 which contains the personalized settings. In one example, the server receives a user identifier along with the list of available wireless networks. The server then accesses the user's account and receives the personalized settings which are then applied to the attributes of network profiles associated with a wireless network on the list. In various embodiments, users may configure personalized settings (e.g., the "aggressiveness") at which a digital device 1002 may connect to a wireless network. Such configurations could include:
  (a) Connect to anything open regardless of shared indicator;
  (b) connect to anything open except those with default manufacturer SSIDs (e.g., "linksys") that likely indicate the owner simply left the access point open out of the box and is unaware how to configure security functions;

c) connect to anything open that the profile server 108 has seen (or stored information regarding the Wi-Fi network); or (d) connect to anything open with a shared indicator of "shared," or has been marked as shared by some other means.

Those skilled in the art will appreciate that there may be many personalized settings.

In step 1112, the server removes one or more wireless networks from the list or network profiles based on the personalized settings. For example, the personalized settings may indicate that the user only wishes to connect to wireless networks that support videoconferencing and maintain a user defined QOS requirement. The server may then remove any wireless networks from the list of available wireless networks based on the attributes either from the network profiles or recent received from the digital device 1002 that do not meet the user's personalized settings.

In some embodiments, the personalized settings may then be taken into account either before or after comparison of attributes from the network profiles. In one example, personalized settings indicate that the user does not wish to connect to a wireless network that is not designated as "shared" or providing certain services. In one example, the rules server 1010 either does not retrieve the network profiles associated with networks that do not provide the necessary service and/or does not compare attributes associated with those networks. In other embodiments, the digital device 1002 applies personalized settings to results (e.g., the wireless network selection) received from the rules server 1010 before accessing a preferred wireless network.

In step 1114, the server compares the attributes of the remaining wireless networks on the list. In various embodiments, the server will apply a weight and normalize one or more of the attributes (e.g., metrics) from within the network profiles. In some embodiments, older attributes may be removed or weighed less than other attributes that are newer. In one example, any metric that is over one week old may receive less weight than a similar newer metric. In another example, a metric that is over one month old may be removed from the network profiles or not considered in the comparison. Those skilled in the art will appreciate that not all attributes or information from within the network profiles may be taken into account in the comparison.

Each network profile may comprise any number of attributes. In one example, the rules server 1010 makes a wireless network selection based on comparing a metric from two different network profiles. In some embodiments, the rules server 1010 selects a wireless network based on a comparison between two similar metrics (i.e., the latency metric from the first network profile is compared to the latency metric from the second network profile). Those skilled in the art will appreciate that the rules server 1010 may select a wireless network based on comparisons between two similar recently received metrics or a recently received metric and another within a network profile.

In other embodiments, the rules server 1010 selects a wireless network based on a comparison of two dissimilar metrics (i.e., the latency metric from the first network profile is compared to a bandwidth metric from the second network profile). The rules server 1010 may execute an algorithm to weigh and normalize similar and/or dissimilar metrics or attributes in order to make a comparison for selecting the appropriate wireless network. In one example, the rules server 1010 compares a latency metric in the first network profile to a bandwidth metric in the second network profile. The rules server 1010 may execute an algorithm to weigh and normalize the metrics. The algorithm may weigh the latency metric more than the bandwidth metric since latency may have a greater impact on network performance.

An attribute or metric may receive different weights depending on any number of factors. For example, a latency metric may receive a given weight when the metric falls within an acceptable range, otherwise the latency metric may be significantly less weight. A metric recently received from the digital device 1002 may receive greater weight than a metric of a similar type within a network profile. Those skilled in the art will appreciate that there are many ways to compare similar and/or dissimilar performance and/or qualitative metrics.

In step 1116, the server selects a wireless network based on the comparison of attributes. The wireless network selection may comprise a single preferred wireless network or a list of wireless networks sorted in order of preference. In one example, the rules server 1010 identifies the most preferred network, the second most preferred network, and so on. The rules server 1010 then provides the wireless network selection to the digital device 1002 in step 1118.

In various embodiments, the rules server 1010 only compares metrics that are recently received from the digital device 1002. In one example, two latency metrics are received from the digital device 1002. Each latency metric is associated with a separate wireless network identified on a list of available networks. In this example, the rules server 1010 may select a wireless network based on a comparison of the two attributes.

Figure 12:
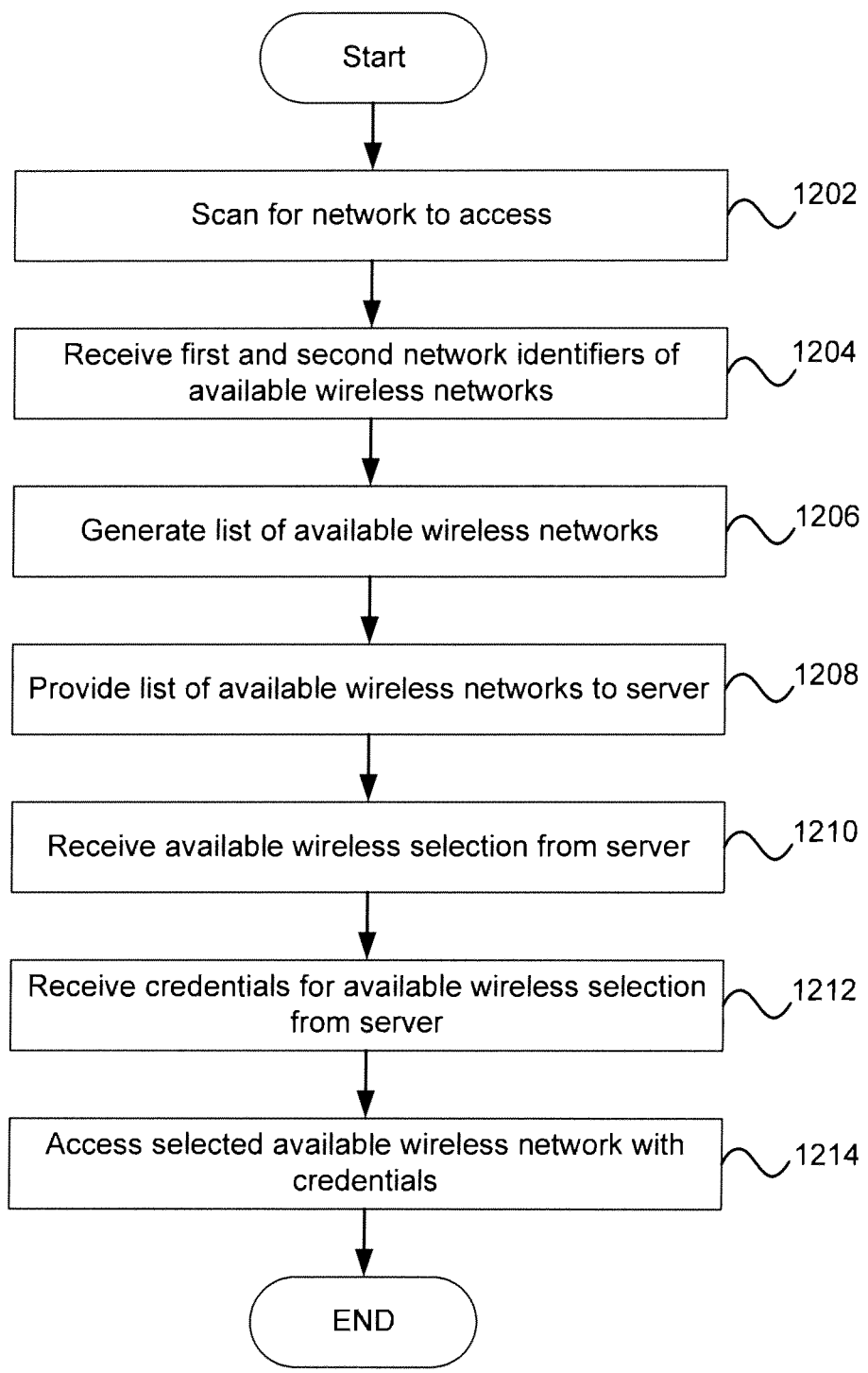
FIG. 12 is a flow diagram of an exemplary process for selecting a wireless network.

FIG. 12 is a flow diagram of an exemplary process for selecting a wireless network. In step 1002, the digital device 1002 enters into an area with two wireless networks and the digital device 1202 scans for networks to access. In step 1204, the digital device 1002 receives a first and a second network identifier of available wireless networks. As discussed herein, the first and second network identifiers may comprise BSSIDs, SSIDs, or any other network identifiers. For example, the first network identifier may comprise a BSSID and the second network identifier may comprise an SSID identifier. In another example, the first network may provide multiple identifiers including a BSSID and an SSID while the second network provides only an SSID. In this example, the first network identifier may comprise both the BSSID and the SSID of the first network device while the second network identifier is only an SSID of the second network device.

In step 1206, the digital device 1002 generates a list of available wireless networks. For example, the digital device 1002 may generate a list comprising the first network identifier and the second network identifier. The list is then provided to a server in step 1208.

In step 1210, the digital device 1002 receives a wireless network selection from the server. The wireless network selection may comprise an identifier that identifies the selected wireless network or identifies the network device associated with the selected wireless network (e.g., a BSSID and/or SSID of the network device). In various embodiments, the wireless network selection may comprise a list of wireless networks sorted by preference. The list may comprise two or more identifiers that identifies a selected wireless network or network device.

In step 1212, the digital device 1002 receives credentials for the wireless network selection from the server. In some embodiments, the credentials are received from the same server that received the list of available wireless networks from the digital device 1002.

In various embodiments, the digital device 1002 receives the wireless network selection from the server and then provides a credential request to receive the credentials for the desired network. In one example, the digital device 1002 provides the credential request in the same manner that the digital device 1002 provided the list of available wireless networks (e.g., over an open port of a network). In some embodiments, the preferred network does not require credentials or the credentials are stored locally on the digital device 1002.

In step 1214, the digital device 1002 accesses the selected wireless network with the credentials. The process of applying the credentials to a login page or the like is discussed herein.

In various embodiments, the digital device 1002 may provide the list of available wireless networks to the server over an open port of a network device in a manner similar to providing a credential request discussed herein. In other embodiments, the digital device 1002 may provide the list to the server over another network. In one example, the digital device 1002 generates a list of available Wi-Fi networks and provides the list over a cellular network (e.g., EV-DO or HSDPA network). In this example, the wireless network selection may be returned to the digital device over the cellular network and then the digital device 1002 may attempt to access the preferred Wi-Fi network.

In another example, the digital device 1002 accesses one wireless network. The digital device 1002 can then provide a list of the available wireless networks to the server. The server may return the wireless network selection to the digital device 1002. If the preferred wireless network is not the network that the digital device 1002 has originally accessed, then the digital device 1002 may drop the connection and access the preferred wireless network.

Although FIGS. 10-12 contemplate a server receiving a list of available wireless networks, determining a wireless network selection, and providing the selection to the digital device 1002, those skilled in the art will appreciate that a server is not necessary. In one example, the digital device 1002 generates a list of available wireless networks and then retrieves any available information regarding the networks on the list (e.g., from locally stored network profiles, from one or more network devices, from a local or remote database, and/or retrieving information from another network such as the Internet). The digital device 1002 may then make comparisons based on what attributes associated with the networks are available to make a selection or generate a prioritized list. The digital device 1002 may then access the selected wireless network.

In various embodiments, the digital device 1002 may generate and provide attributes regarding one or more networks to update the network profiles. In one example, the digital device 1002 determines the quality of the signal, bandwidth, or any other metrics and provides those metrics along with the list of available wireless networks to a server. In another example, as the digital device 1002 accesses a selected wireless network, measures attributes, and provides the attributes update metrics within a network profile. Attributes (e.g., latency metrics, bandwidth metrics, and QOS metrics) may be taken by the digital device 1002 at any time and used to update the network profiles.

Figure 13:
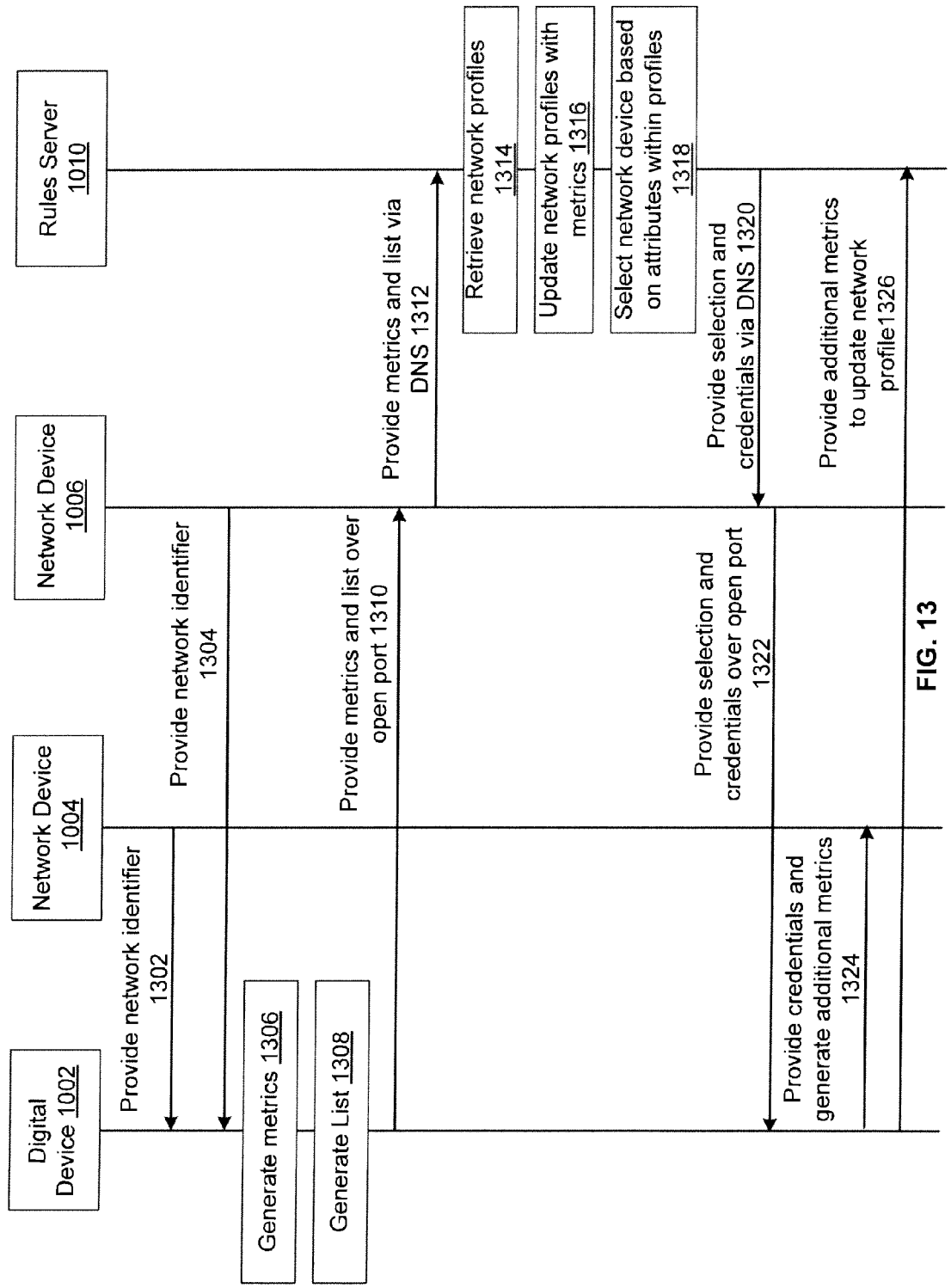
FIG. 13 is a diagram for selecting a wireless network and accessing the selected wireless network.

FIG. 13 is a diagram for selecting a wireless network and accessing the selected wireless network. In various embodiments, the network device 1004 and network device 1006 provide a first and second network identifiers to the digital device 1002 in steps 1302 and 1304. In step 1306, the digital device 1002 generates metrics (i.e., attributes) by taking measurements regarding wireless networks associated with the network device 1004 and network device 1006. In some examples, the metrics may include latency, strength of signal, or QOS metric.

In step 1308, the digital device 1002 generates a list of available wireless networks which may include the network identifier from the network device 1004 as well as the network identifier from the network device 1006. In some embodiments, the digital device 1002 may also comprise personalized settings which may indicate a preference between the two network identifiers or eliminate one or both of the network identifiers. In one example, the personalized settings indicate that only open networks that do not have a default manufacturer SSID (e.g., "linksys") may be accessed. In this example, if the network identifier from the network device 1004 indicates a default manufacturer SSID, the digital device 1002 may not include that network identifier for the network device 1004 in the list of available wireless networks.

In some embodiments, if the digital device 1002 cannot generate a list identifying at least two or more networks, the digital device 1002 does not send the list. In one example, if the digital device 1002 can only identify one available wireless network that meets the user's requirements, then the digital device 1002 may attempt to access the wireless network directly or send a credential request for to a server to retrieve any necessary credentials for access.

In step 1310, the digital device 1002 provides the attributes and the list of available wireless networks over an open port (e.g., port 53) of the network device 1006 which acts like a proxy in providing the attributes and list of available networks to the rules server 1010. In other embodiments, the digital device 1002 provides the attributes and the list over an open port of the network device 1004. Alternately, the digital device 1002 may provide the attributes and the list over separate networks (e.g., the attributes over an open port of one of the network devices and the list over a cellular network). In step 1312, the network device 1006 acts as a proxy by providing the attributes and list via DNS to the rules server 1010.

In step 1314, the rules server 1010 retrieves network profiles. In one example, the rules server 1010 retrieves the network identifiers from the list and retrieves network profiles associated with the network identifiers.

In step 1316, the rules server 1010 (or profile server 1014) updates attributes within the network profiles with the attributes received from the digital device 1002. In one example, a new latency metric from the digital device 1002 is used to update the network profile associated with the network identifier from the network device 1004. A time-to-live value associated with the attribute may also be updated to indicate that the new latency metric is recent.

In step 1318, the rules server 1010 selects a network device based on comparing the attributes from within the network profiles. In some embodiments, the rules server 1010 also applies personalized settings from the digital device 1002 or from an account associated with the digital device 1002 (e.g., via the web server 1018) before making a selection. The rules server 1010 may prepare a prioritized list of the two network devices from the list provided by the digital device 1002. The list is prioritized based on which of the two network devices provides the most desirable service based on the metrics from the network profiles.

In step 1320, the rules server 1010 provides the wireless network selection and credentials via DNS back to the network device 1006 to function as a proxy to send the information to the digital device 1002. In one example, the rules server 1010 selects the network device 1004. The rules server 1010 may retrieve credentials for the network device 1004 based on the network identifier of the network device 1#. For example, the rules server 1010 may provide a credential request to the credential server 1016. The credential server 1016 may provide a credential request response containing necessary credentials to the rules server 1010 which then sends both the credentials received from the credential server 1016 as well as the wireless network selection to the digital device 1002.

In step 1322, then network device 1006 provides the network selection and the credentials over the open port to the digital device 1002. In step 1324, the digital device 1002 provides the credentials to access the network device 1004 and generates additional attributes regarding the network (i.e., take additional measurements). Once a connection is established, the new attributes are provided to the rules server 1010 or profile server 1014 to update the network profile associated with the network device 1004 in step 1326. In one example, the digital device 1002 may measure the time required to establish the connection with the network device 1004. The time required to establish the connection may then be used to update attributes in a network profile. If a connection is not established or fails, that information may also be provided to update the associated network profile.

In some embodiments, if the network connection with the selected network fails, the digital device 1002 may re-attempt to make the connection. If multiple attempts to make the connection fail, information regarding the failure is sent to update the associated network profile. The digital device 1002 may then attempt to make a connection with another network device (e.g., the network device 1006). In some embodiments, the digital device 1002 re-scans the area, generates a new list of available networks which may not include the network that the digital device 1002 failed to connect. The new list may be sent to the rules server 1010 to receive a new wireless network selection and the process may repeat.

In some embodiments, the rules server 1010 provides a prioritized list of available wireless networks sorted by preference. In one example, the rules server 1010 provides a prioritized list of three networks to the digital device 1002. The digital device 1002 may then attempt to access the first wireless network on the prioritized list. If the digital device 1002 is unable to connect to the first wireless network, then the digital device 1002 may proceed to attempt to connect to the next network on the list. Those skilled in the art will appreciate that the prioritized list may contain all, one, or some of the wireless networks identified in the list of available wireless networks. For example, the rules server 1010 may not identify wireless networks which are known to provide poor performance, do not provide desired service (e.g., VOIP service), and/or are otherwise blacklisted.

In various embodiments, the user of the digital device 1002 may override the wireless network selection to access any wireless network. In one example, the user chooses the priority of available wireless networks. In some embodiments, the user may configure the digital device 1002 or configure an account with the web server 1018 to include personal preferences that may reorder or otherwise alter a prioritized list of wireless networks from the rules server 1010. For example, the list of available wireless networks may be altered based on user preferences by the digital device 1002 or the web server 1018 prior to being provided to the rules server 1010.

In some embodiments, in addition to one or more open Wi-Fi networks, there may also be one or more encrypted Wi-Fi networks in a given location. A digital device 1002 may connect to an open Wi-Fi network and transmit the SSID of other Wi-Fi networks, including encrypted Wi-Fi networks, to the rules server 1010 via a network communication protocol such as HTTP.

The rules server 1010 may then determine, based on personalized settings or other rules, that an available encrypted Wi-Fi network is the preferred choice for a network connection. The rules server 1010 may transmit the necessary encryption keys to the digital device 1002 over the current open Wi-Fi network connection and send instructions to the digital device 1002 to switch to the encrypted Wi-Fi network.

Users, applications, and operating systems often desire or require location information even if GPS hardware is unavailable or non-functional (e.g., satellites are not visible). In some embodiments, as an alternative to GPS hardware, users, applications, and operating systems may retrieve location information based on the presence of a network proximately located to a digital device. The location information may be used in any number of ways including used as assisted GPS (i.e., AGPS). For example, the location information may be used to "prime" the GPS hardware to improve speed and/or accuracy.

The locations of networks tend to be fairly stable. As such, the location of the physical location of networks (e.g., routers, hotspots, or other network devices) may be identified and used to identify the location of a user. In one example, a user with a digital device may scan an area for wireless networks. One or more wireless networks may be identified. Information regarding the identified wireless network(s) may be provided to a server which may comprise a data structure (e.g., a table or database) identifying a location (e.g., GPS coordinates) of the identified wireless network(s). The server may provide the location to the digital device of the user. The digital device may then display the information and/or provide the information to one or more applications (e.g., a map application) or the operating system of the digital device.

Figure 14:
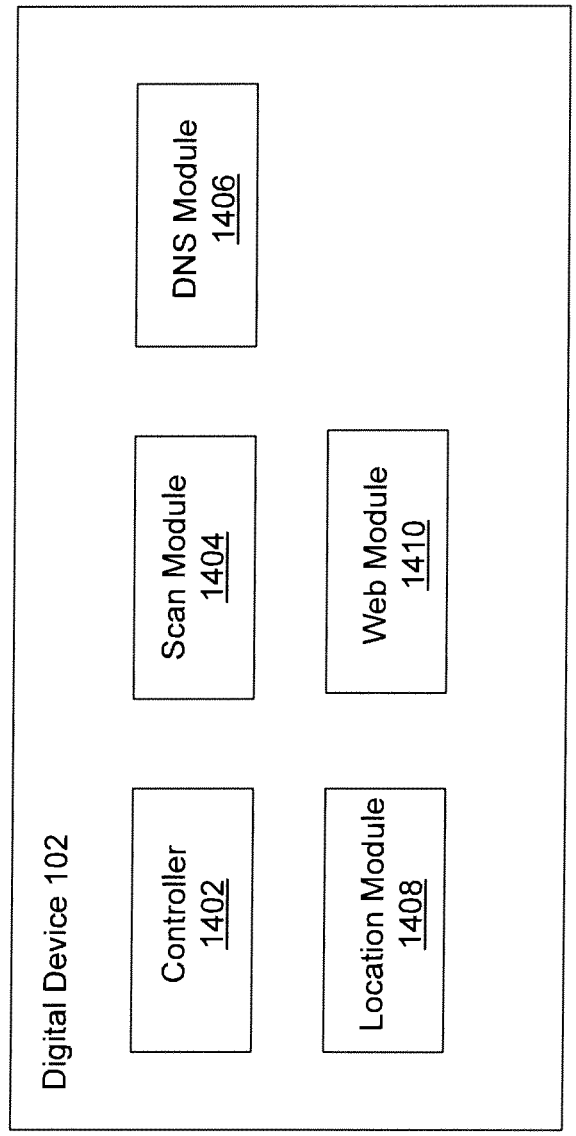
FIG. 14 is a block diagram of an exemplary digital device.

FIG. 14 is a block diagram of an exemplary digital device 102. The digital device 102 may comprise a controller 1402, a scan module 1404, a DNS module 1406, a location module 1406, and a web module 1410. In some embodiments, an application (e.g., a client) is installed on the digital device 102 to determine location information. The application may comprise one or more of the modules depicted in FIG. 14. For example, the application may comprise the DNS module 1406 for generating and transmitting a location request based on identified wireless networks and the location module 1408 for retrieving location information from a location response.

The controller 1402 may be configured to control the scan module 1404, the DNS module 1406, the location module 1406, and/or the web module 1410. In one example, the controller 1402 may trigger a scan by the scan module 1402, generate a DNS protocol formatted location request with the DNS module 1406, provide the location request, receive a location response, and retrieve location information from the location response. In some embodiments, the controller 1402 may provide the location information to the user (e.g., display the response), to an application on the digital device 102 (not depicted), or to an operating system (not depicted).

In various embodiments, the scan module 1402 may be configured to scan an area proximity located to a digital device 102 for wireless networks. Those skilled in the art will appreciate that scanning for available wireless networks may be a fairly common process to identify available networks for network access. Once the scan module 1402 scans an area for wireless networks, one or more wireless networks may be identified. For example, a list of network identifiers, such as SSIDs and/or BSSIDs, associated with wireless networks and/or network devices may be detected. One or more of the listed wireless networks may be secured (e.g., requiring a password, username, passcode, or record) or unsecured. The list may include any number of network identifiers (e.g., one or more).

The DNS module 1406 may be configured to generate a location request based on one or more of the scanned networks. A location request is a message directed to a second digital device (e.g., a server) over a network to request location information. The location request is a message that may be formatted in any number of ways. In one example, the location request is formatted as a DNS protocol message (e.g., a message formatted as a DNS LOC record as defined in RFC 1876). The location request may be formatted in a UDP protocol. In one example, one of the scanned network identifiers, such as a BSSID, may be included in the location request. Any number of network identifiers may be included in the location request.

In some embodiments, by using DNS for this lookup of the location, the location request and associated location response described herein may be carried over a connection-less distributed protocol that may be universally or nearly universally supported over the Internet. The location request and location response may be in a standard format. As such, the digital device 102 may not need to authenticate over hotspots or network devices that are open at the Wi-Fi layer in order to retrieve location.

For example, a network device may require access information (e.g., a username, password, or other information) prior to allowing access to a network. The network device, however, may also contain one or more open ports (e.g., port 53) to provide services without requiring access information. In one example, the network device may allow DNS services through port 53. The digital device 102 may generate a location request formatted with a DNS protocol as discussed herein and provide the location request to the network through the open port of the network device without providing access information. The digital device 102 may subsequently receive the location response containing location information from the open port.

The location request may include any type of information, including, but not limited to, signal strength for one or more of the scanned networks, a license identifier (e.g., a license key), and a digital device 102 identifier. The signal strength may be an indicator of the strength of a signal associated with a wireless network detected by the digital device 102. In one example, the scan module 1404 may scan an area and provide a list of detected wireless networks. One or more of the wireless networks may have an associated signal strength indicator which indicates the strength of the potential connection between the digital device 102 and one of the wireless networks. In some embodiments, the signal strength may be determined by scanning an area periodically or continuously over a predetermined time. The strength of a signal associated with a detected wireless network may be averaged (e.g., geometrically averaged) or statistically measured to create the associated signal strength indicator.

The license identifier may be an identifier that is associated with an application or client on the digital device 102. In various embodiments, the user installs an application to determine the location of the digital device by means and methods described herein, retrieve credentials as discussed herein, or perform any number of actions. The application may be associated with a license identifier which may be provided in the location request.

The device identifier may be any identifier that may be used to identify the device. In some embodiments, the device identifier is unique. In some example, the device identifier is a MAC address, serial number, IP address, version number of software installed on the digital device 102, an IP address, and/or any other identifier.

Location information may be any information that identifies the physical location of a network and/or network devices (e.g., access points) associated with a network. In one example, location information may comprise latitude and longitude coordinates. Location information may comprise altitude (e.g., above or below sea level). Those skilled in the art will appreciate that location information may comprise any information that may be used to provide a location or approximation of a location to a user, digital device, network device, application, operating system, or the like.

In some embodiments, the DNS module 1406 may encode the one or more network identifiers and/or other information within the location request. For example, the DNS module 1406 may hex-encode some or all of the information within the location request. The location request may also be encrypted. All or part of the location request may also be hashed. For example, the DNS module 1406 may hash the BSSID with a shared secret value to generate a new name to prevent against abuse of the service. An addition of the device identifier (UUID) to the location request may also be included. For example, the end result may appear as:

<uuid><bssid hash>.<server domain>

The controller 1402 or the DNS module 1406 may provide the location request. In some embodiments, the controller 1402 or the DNS module 1406 may transmit the location request via a network. In one example, the DNS module 1406 provides the DNS protocol formatted location request to a location server via a network device. The DNS module 1406 may provide the location request over an open port of the network device. The open port may be port 53. This location request may be provided over the network device is a manner similar to the manner of providing the credential request discussed herein.

The location module 1408 may be configured to receive a location response from over a network. The location response may be related to the location request. The location response may contain location information. In some embodiments, the location module 1408 retrieves the location information from the location response. In some examples, the location module 1408 provides all or some of the location to the user (e.g., display GPS coordinates to the user), an application on the digital device 102, an operating system on the digital device 102, or another digital device.

In some embodiments, the location module 1408 decodes and/or decrypts information from the location response. The location request may be formatted as a DNS protocol or any protocol. In some embodiments, the location module 1408 decodes location information from the location response. In one example, all or some of the location information may be hex-encoded.

The location response may also be received via the Internet. In some embodiments, the location module 1408 decrypts all or some of the location response (e.g., with an encryption key) and/or authenticates the location response. The location module 1408 may then provide the location information from the location response based on the authentication.

The web module 1410 may be configured to provide the location request and/or receive the location response from over the Internet or other accessible network. In some embodiments, the web module 1410 may function as a web browser. The web module 1410 may generate the location request (e.g., through HTTP, HTTPS, or XMPP) including the network identifiers and provide the location request to another digital device via the accessed network. The web module 1410 may also receive a location response (e.g., through HTTP, HTTPS or XMPP) and retrieve the location information.

Those skilled in the art will appreciate that although some embodiments contemplate scanning for wireless networks, a wired network may also be used to determine the location of the user. For example, when a digital device is coupled to a wired network (e.g., via an Ethernet cable), the digital device may receive a network identifier such as an IP address, host name address, or the like. In one example, the network identifier is an identifier of the network device providing access. The network identifier may be provided to the location server which then may provide the physical location of the network and/or the network device providing access. In some embodiments, the digital device 102 may send the location request over the network once access has been established (e.g., via HTTP). In various embodiments, the digital device 102 may send the location request over a different network. In one example, the digital device 102 may send the location request via DNS protocol over a wireless network.

Figure 15:
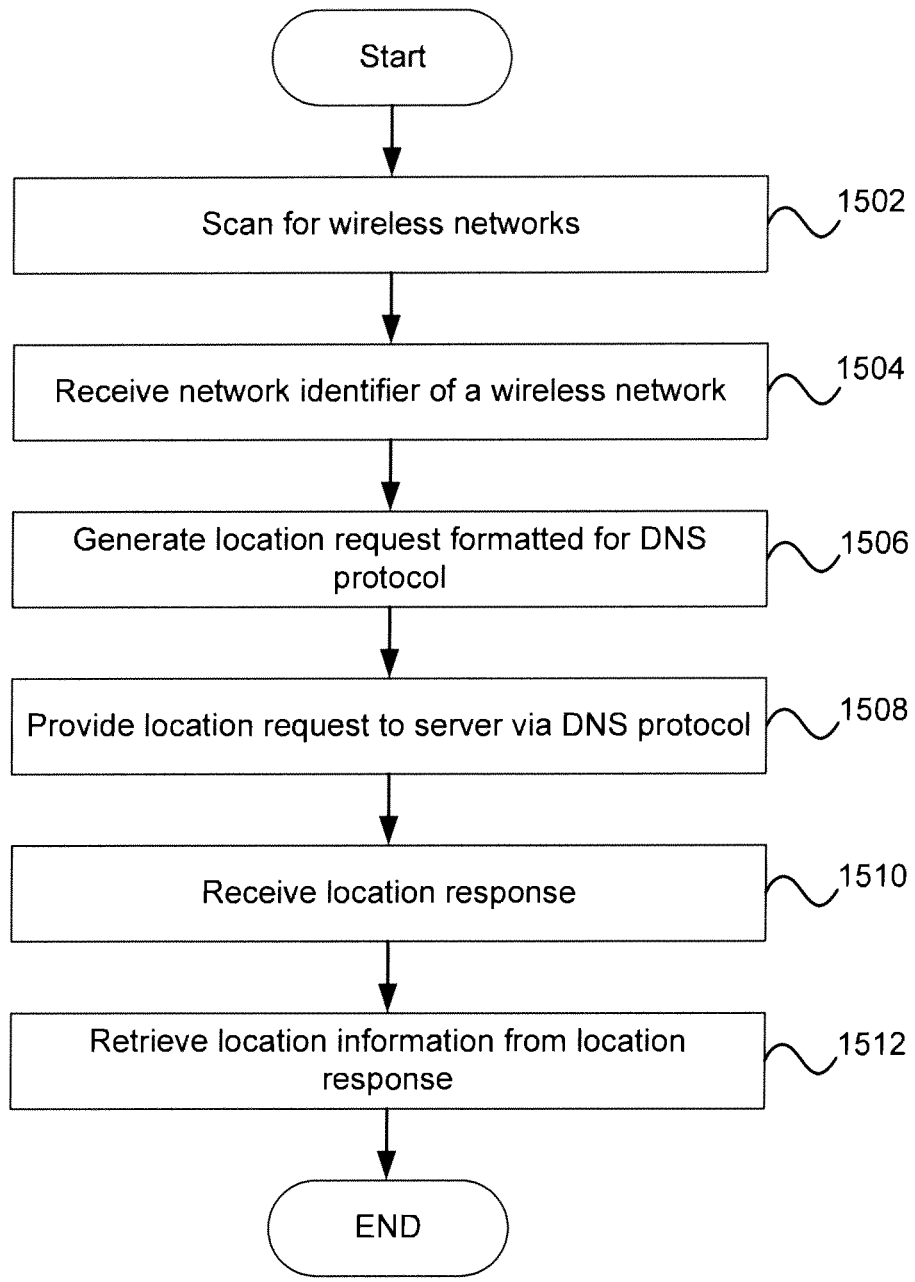
FIG. 15 is a flowchart of an exemplary method for receiving location information via a wireless network through a DNS protocol formatted message.

FIG. 15 is a flowchart of an exemplary method for receiving location information via a wireless network through a DNS protocol formatted message. In step 1502, the scan module 1404 scans an area for wireless networks (e.g., network devices broadcasting a BSSID and/or SSID for a network). The scan module 1404, for example, may be part of an operating system, a separate application, plug-in, or client. In step 1504, the scan module 1404 detects a network identifier of a wireless network via the scan. The network identifier may be any information that identifies a wireless network or network device including, for example, a BSSID and/or an SSID. Any number of network identifiers associated with any number of wireless networks may be received via the scan.

In step 1506, the DNS module 1406 generates a location request formatted for a DNS protocol. The location request may include the network identifier. In some embodiments, the location request only includes a single network identifier even if the scan by the scan module 1404 reveals more than one network identifiers. In other embodiments, the location requests include some or all of the network identifiers revealed in the scan by the scan module 1404.

In step 1508, the controller 1402 or the scan module 1404 provides the location request to a digital device, such as a server, on a network via the DNS protocol. For example, the digital device 102 may provide the location request to a location server over an open port of a network device. The process of providing the location request may be similar to providing messages (e.g., credential requests) over an open port of a network device as discussed herein. The open port may be any open port. In one example, the open port is port 53.

In step 1510, the location module 1408 receives a location response from the digital device that received the location request. The location response may contain location information which identifies an approximate location of the network or network device identified by the network identifier.

In step 1512, the location module 1408 retrieves the location information from the location response. The location module 1408 may provide the location information to a user, hardware device, or software program. The location module 1508 may decode the location information.

In some embodiments, the location response may comprise a request for additional information. For example, the location request may contain a network identifier, such as an encoded BSSID, associated with a wireless network. The digital device that receives the location request may not have any information or insufficient information regarding the network identifier. As a result, the digital device that received the location request may provide a location response containing a request for additional information. The DNS module 1404 may then generate a new location request with one or more different network identifiers than the previous location request. The new location request may then be provided to determine if a location can be determined. This process may continue, for example, until a location is identified, all of the network identifiers scanned by the scan module 1404 have been included in one or more location requests, a predetermined period of time has expired, and/or a predetermined number of attempts to identify a location have been reached.

Those skilled in the art will appreciate that the location request may be generated and/or sent at any time. For example, a user may wish to tag photographs taken by a digital camera that does not have a GPS device. The user may take photographs with the digital camera which may also scan an area for wireless network identifiers. One or more of the photographs may be associated with scanned wireless network identifiers. When the digital camera is connected with a network (e.g., via wirelessly or over a wired network), the DNS module 1404 or the web module 1408 may generate a location request. The location request may include one or more of the scanned network identifiers. The controller 1402 may then tag each photograph accordingly based on location information received from a received location response. In some embodiments, there may be a separate location request for each photograph, the location request containing one or more network identifiers associated with that photograph. In other embodiments, there may be a location request for multiple photographs. Tagged location information may be associated with photographs in any number of ways, including, but not limited to, the location information may be printed when the photograph is printed or the location information may appear in metadata associated with the photograph.

Figure 16:
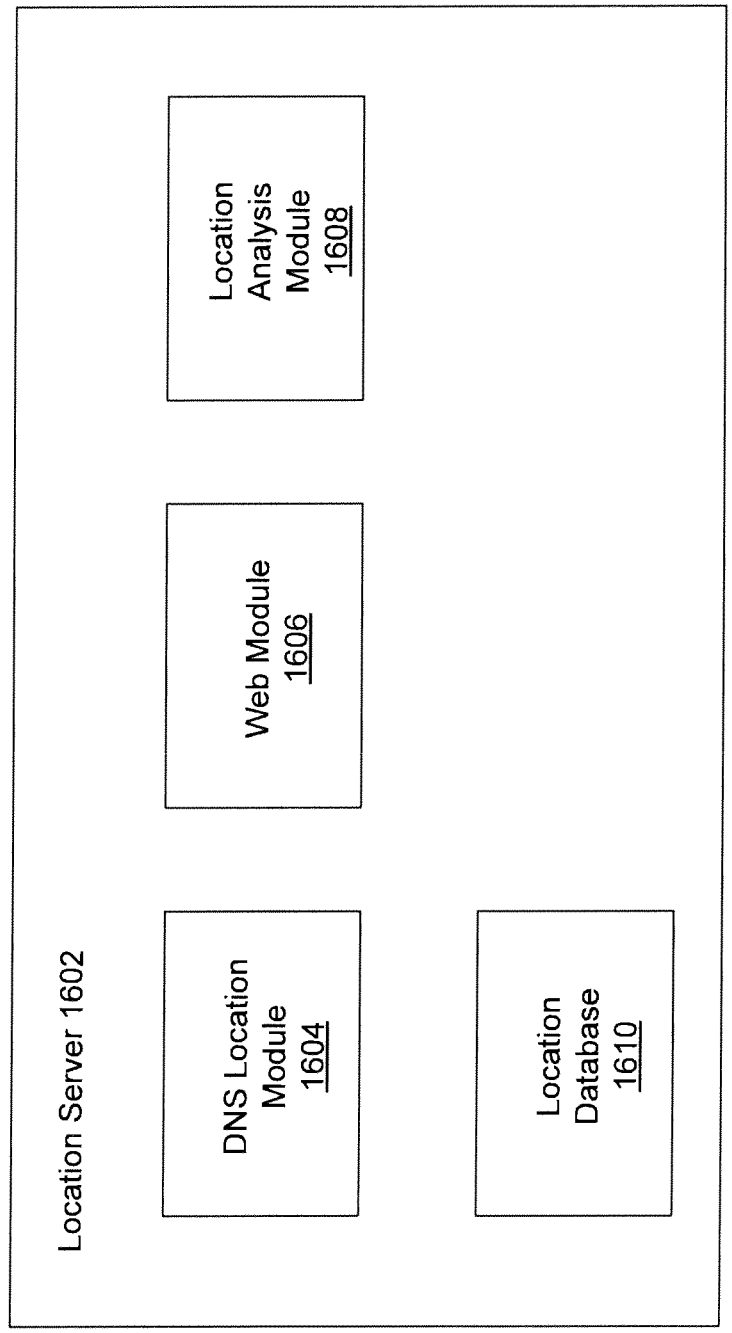
FIG. 16 is a block diagram of an exemplary location server.

FIG. 16 is a block diagram of an exemplary location server 1602. The location server 1602 may be any digital device, including, but not limited to, the credential server 116 (see FIG. 1). The location server 1602 may be configured to collect location information associated with different network identifiers and/or provide location information to digital devices based on a location request. The location server 1602 may comprise a DNS location module 1604, a web module 1606, a location analysis module 1608, and a location database 1610.

The DNS location module 1604 may be configured to receive location requests. In one example, the DNS location module 1604 receives a location request from the digital device 102. The DNS location module 1604 may retrieve one or more network identifiers, the digital device that sent the location request, the version identifier, or any other information from the location request. The DNS location module 1604 may be configured to decode information from the location request (e.g., decode hex-encoded information). In one example, the DNS location module 1604 decodes a network identifier that has been hashed with a shared key. In some embodiments, the DNS location module 1604 may authenticate and/or decrypt the location request.

In some embodiments, the DNS location module 1604 may also receive location identification messages from one or more digital devices. For example, one or more digital devices may comprise GPS devices or may know their approximate location. The digital devices may scan an area to detect network identifiers and send the detected network identifiers and any location information (e.g., from the GPS device or the location sever 1602) to the location server 1602.

A location identification message may comprise one or more network identifiers. The location identification message may also include location information that may be associated with the digital device sending the location identification message and/or one or more of the network identifiers. In some embodiments, the DNS location module 1604 or the location analysis module 1608 may associate the location information with one or more of the network identifiers and store the association in the location database 1610. In various embodiments, the DNS location module 1604 or the location analysis module 1608 may store all or some of the location information and/or the network identifiers within the location database 1610.

The web module 1606 may also be configured to receive location requests (e.g., via HTTP or HTTPS). In some embodiments, the location server 1602 is a web server. In one example, similar to the DNS location module 1604, the web module 1606 receives a location request from the digital device 102. The web module 1606 may retrieve one or more network identifiers, the digital device that sent the location request, the version identifier, or any other information from the location request. The web module 1606 may be configured to decode information from the location request. In some embodiments, the web module 1606 may authenticate and/or decrypt the location request.

In some embodiments, the web module 1606 may also receive location identification messages from one or more digital devices in a manner similar to that of the DNS location module 1604.

The location analysis module 1608 may be configured to determine and store the location or approximate location of a network device based on available location information. In various embodiments, the location analysis module 1608 receives a network identifier and location information from a digital device (e.g., from a network collection message). The network identifier may identify a network device. The location information may identify the location of a digital device, such as a smart phone, that scanned the detected network device. The location analysis module 1608 may associate the location information (e.g., GPS coordinates of the digital device) with the network identifier and store the association in the location database 1610.

In addition to coordinates, the location information may contain a degree of confidence or confidence level of the coordinates. For example, many different types of GPS hardware identify latitude coordinates, longitude coordinates, and a degree of confidence. A degree of confidence may be a range which indicates possible error. For example, a degree of confidence (e.g., precision or range of error) for a particular set of coordinates may be +/−20 feet. In other words, the GPS hardware may be located within 20 feet of the particular set of coordinates. The degree of confidence may be stored with related coordinates within the location database 1610.

In various embodiments, the location analysis module 1608 determines a location for a network device after a predetermined period of time and/or after having received a predetermined number of network identification messages identifying a particular network identifier. For example, the location analysis module 1608 may only determine a location for a network device after a set number of messages identifying the network device and location information is received (e.g., a number of network collection messages regarding the network device has been received). Those skilled in the art will appreciate that a single network collection message may have erroneous location information. As the number of different digital devices detect the same network identifier and provide location information, the confidence of the location of the network identifier may increase. As such, for example, after ten location identification messages containing the same network identifier have been received, the location analysis module 1608 may then determine the location of the network associated with the network identifier.

The location analysis module 1608 may also determine an overall degree of confidence for the location. In one example, the location analysis module 1608 may statistically measure, weigh, and/or average available degrees of confidence associated with the location information that was used to determine the location. The overall degree of confidence may indicate the range of error of the location that may be provided to the digital device 102. In some embodiments, the location response comprises the location information as well as the overall degree of confidence.

In some embodiments, the location analysis module 1608 determines the location of a network by retrieving location information associated with that network identifier (e.g., location information received over a predetermined period of time or all network identification messages received by the location server 1602 and/or other digital devices). The location analysis module 1608 may then determine the location of the network device through any statistical means (e.g., averaging the GPS coordinates of all digital devices that detected the network device).

In some embodiments, the location analysis module 1608 also retrieves degrees of confidence for one or more of the GPS coordinates and uses the information to determine the location of the network device. For example, in a statistical process, the location analysis module 1608 may weigh GPS coordinates based, at least in part, on the degree of confidence. In one example, the location analysis module may highly weigh GPS coordinates with a low range of error (e.g., the degree of confidence of +/−5 feet). Similarly, the location analysis module may reduce or eliminate the impact of GPS coordinates with a high range of error (e.g., degree of confidence of +/−500 feet). Those skilled in the art will appreciate that the GPS coordinates may be weighted based in part on the degree of confidence in any number of ways.

In some embodiments, the location analysis module 1608 thresholds the data. For example, the location analysis module 1608 may eliminate outliers (e.g., the majority of GPS coordinates are grouped while one or two are located many miles from the group) prior to determining the location. Further, the location analysis module 1608 may eliminate location information that suggests unreliability. For example, the location analysis module 1608 may eliminate location information that indicates that the detecting digital device was moving or at a high altitude relative to other location information. Similarly, the location analysis module 1608 may eliminate location information that indicates that the range of error for the GPS coordinates is too high.

Those skilled in the art will appreciate that the location analysis module 1608 may periodically confirm the location of a network identifier by re-determining the location after a predetermined period of time, a predetermined number of network identification messages have been received, or a number of network identification messages have been received that suggest that the network may have moved. It is not uncommon, for example, for a business to close and sell physical assets. As such, a network device may be sold and used at a different location. In one example, the location analysis module 1608 may receive a number of network identification messages that comprise a network identifier with location information that is at variance with that location information already collected regarding that network identifier. Over a predetermined period of time or a predetermined number of network identification messages have been received, the location analysis module 1608 may determine the location of the network identifier based on the new information and compare the newly determined location to that location which was previously stored. If the location is significantly different, the location analysis module 1608 may update the location database 1610 with the new location or wait to receive more information before making changes.

The location analysis module 1608 may also weigh the location of the network identifier based on signal strength or the quality of the GPS location. In some embodiments, the location information includes an indicator of signal strength of a network identifier and/or a degree of confidence of a GPS location (e.g., within 20 meters of the digital device that scanned the network identifier). The signal strength and/or degree of confidence of the GPS location may be a factor in determining the location over any number of relevant network identification messages.

The location database 1610 is any data structure (e.g., table) that comprises a plurality of network identifiers and an associated location (e.g., location information). The location database 1610 may also store location identification messages, digital device identifiers, license identifiers, or the like.

Figure 17:
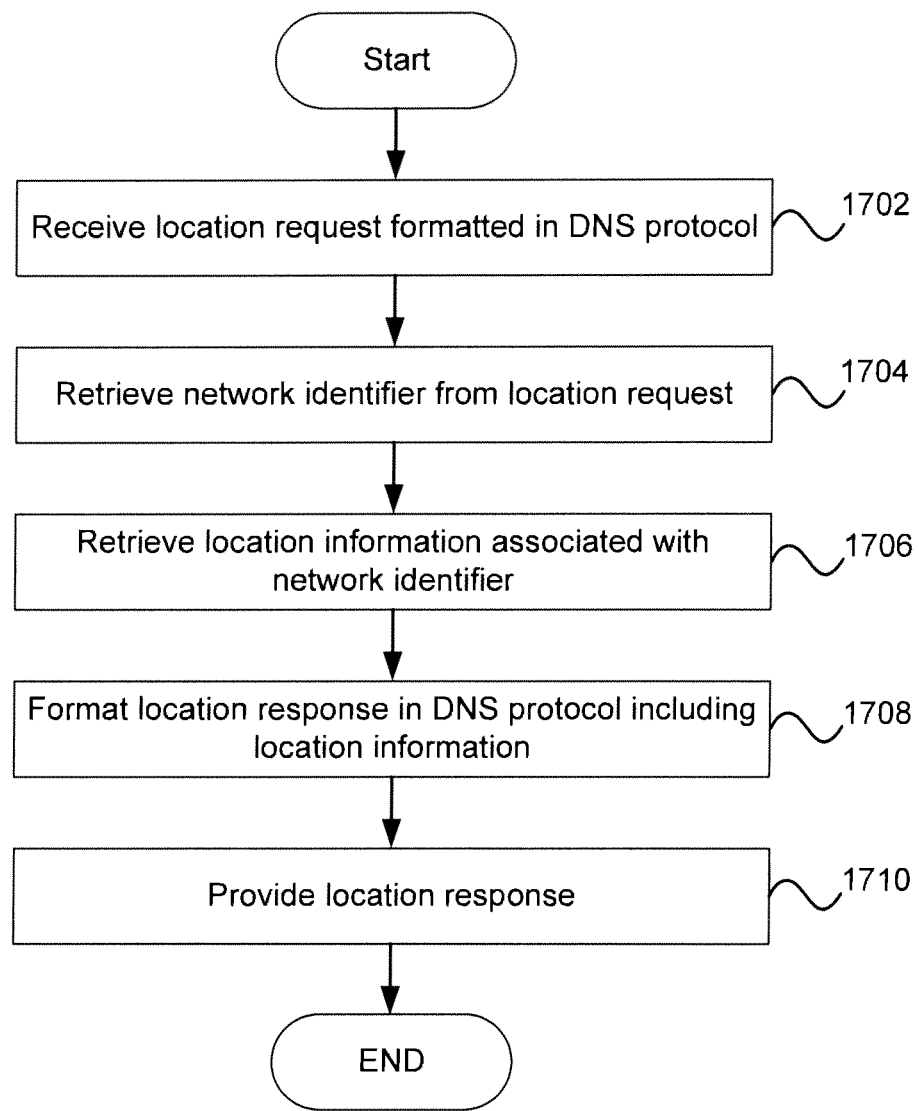
FIG. 17 is a flowchart of an exemplary method for providing location information via a wireless network through a DNS protocol formatted message.

FIG. 17 is a flowchart of an exemplary method for providing location information via a wireless network through a DNS protocol formatted message. In step 1702, the DNS location module 1604 receives a location request formatted for a DNS protocol. The location request may comprise one or more network identifiers (e.g., BSSID or SSIDs). The DNS location module 1604 may then retrieve the network identifier(s) from the location request in step 1704.

In step 1706, the location analysis module 1608 may retrieve location information associated with the network identifier(s) from the location database 1610. If there is no location information associated with the network identifier (s), then the location analysis module 1608 may request additional information from the digital device that provided the location request.

In step 1708, the DNS location module 1604 may format a location response including the location information in a DNS protocol. Those skilled in the art will appreciate that that, in some embodiments, the web module 1606 may receive the location response as an HTTP formatted message. The web module 1606 may also provide the location response in as HTTP formatted message.

In step 1710, the location response is provided to the digital device that provided the location request. In various embodiments, the location server 1602 will return the location response in the same manner as the location request. For example, if the location request was formatted with the DNS protocol, the location response will also be returned as a DNS protocol formatted message.

In some embodiments, the digital device 102 may receive a location response from the location server 1602 with location information for a plurality of different networks. For example, the scan of the area of the digital device 102 may include three different BSSIDs. The three BSSIDs may be included in a location request (e.g., over HTTP), and the digital device 102 may receive a location response with location information for all three BSSIDs. In various embodiments, the digital device 102 may select location information for one of the three BSSIDs, average the location information, or triangulate a position of the digital device 102 based on signal strength of each of the BSSIDs. Those skilled in the art will appreciate that the location of the digital device 102 may be determined in any number of ways.

In various embodiments, the digital device 102 may provide a location request or a plurality of location requests containing a plurality of network identifiers. The location server 1602 may retrieve the network identifiers from the location request(s), identify location information associated with two or more of the network identifiers, and triangulate the position of the digital device 102. The triangulation may be based, in part, on the degree of confidence of the location information stored by the location server 1602. The location server 1602 may then provide a location response containing the triangulated information back to the digital device 102.

Figure 18:
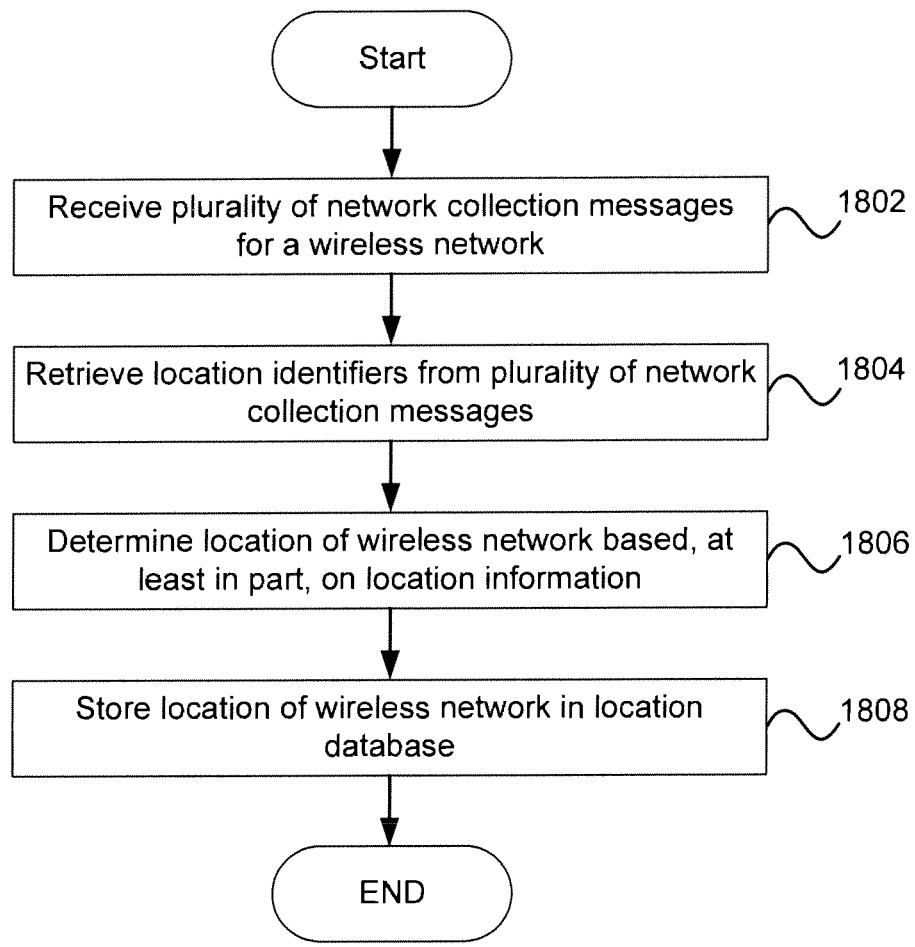
FIG. 18 is a flowchart of an exemplary method for collecting location information through a network.

FIG. 18 is a flowchart of an exemplary method for collecting location information through a network. In step 1802, the DNS location module 1604 receives a plurality of network collection messages for a wireless network (e.g., associated with one or more network identifiers).

In step 1804, the DNS location module 1604 retrieves location identifiers from the plurality of network collection messages. Information from the plurality of network collection messages, including network identifiers and location information, may be stored in the location database 1610.

In step 1806, the location analysis module 1608 determines a location of the network identifiers based, at least in part, on the location information stored in the location database 1610. The location may comprise GPS coordinates, altitude, or any other determination. The location may also comprise a confidence measure (e.g., the confidence measure may indicate that the location is approximate and may be within 20 meters.)

In some embodiments, the location analysis module 1608 determines the location of a network by statistically analyzing location information associated with the network identifier. For example, over time, there may be any number of network collection messages received that include location information associated with a particular network identifier. After a predetermined amount of time and/or a predetermined number of messages received for that network identifier, the location analysis module 1608 may determine the location of the network. In one example, the location analysis module 1608 removes any outliers and then determines the approximate location of the network by averaging the location information from the plurality of different network collection messages. The resulting location may then be associated with the network identifier for the network and stored within the location database 1610.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
   scanning, by a digital device, an area for wireless networks;
   receiving, in response to the scanning by the digital device, two or more Basic Service Set Identifications (BSSIDs), each of the BSSIDs being associated with at least one of two or more wireless networks;
   generating, by the digital device, a location request in a Domain Name System (DNS) protocol formatted message, the location request comprising the two or more BSSIDs;
   providing, by the digital device, the location request over an open port of a network access device associated with the at least one of the two or more wireless networks, the open port supporting DNS services even if the network access device has not granted network access to the digital device;
   receiving, by the digital device, a DNS protocol formatted location response based on the location request;
   retrieving at least one location identifier and at least one credential from the location response, the at least one location identifier and the at least one credential being selected by a server from a plurality of location identifiers and a plurality of credentials based on at least one of the two or more BSSIDs of the location request; and
   establishing, by the digital device, a connection to the network access device associated with the at least one location identifier, using the at least one credential to access the at least one of the two or more wireless networks.

2. The method of claim 1, further comprising encoding the two or more BSSIDs in the location request.

3. The method of claim 1, further comprising decoding the at least one location identifier from the location response.

4. The method of claim 1, wherein the open port is port 53.

5. The method of claim 1, wherein the at least one location identifier comprises a latitude and a longitude.

6. The method of claim 1, further comprising providing the at least one location identifier to an application of the digital device.

7. The method of claim 1, further comprising providing GPS coordinates and one or more network device identifiers to the server.

8. A system comprising:
   a scan module, of a digital device, configured to scan an area for wireless networks and to receive, in response to the scanning, two or more Basic Service Set Identifications (BSSIDs), each of the BSSIDs being associated with at least one of two or more wireless networks;
   a Domain Name System (DNS) module, of the digital device, configured to generate a location request in a DNS protocol formatted message, the location request comprising the two or more BSSIDs, and to provide the location request over an open port of a network access device associated with the at least one of the two or more wireless networks, the open port supporting DNS services even if the network access device has not granted network access to the digital device;
   a location module, of the digital device, configured to receive a DNS protocol formatted location response based on the location request and to retrieve at least one location identifier and at least one credential from the location response, the at least one location identifier and the at least one credential being selected from a plurality of location identifiers and a plurality of credentials based on at least one of the two or more BSSIDs of the location request; and
   a communication network interface configured to establish a connection to the network access device associated with the at least one location identifier, using the at least one credential to access the at least one of the two or more wireless networks.

9. The system of claim 8, wherein the DNS module is further configured to encode the two or more BSSIDs in the location request.

10. The system of claim 8, wherein the location module is further configured to decode the at least one location identifier from the location response.

11. The system of claim 8, wherein the open port is port 53.

12. The system of claim 8, wherein the at least one location identifier comprises a latitude and a longitude.

13. The system of claim 8, wherein the location module is further configured to provide the at least one location identifier to an application of the digital device.

14. The system of claim 8, wherein the DNS module is further configured to provide GPS coordinates and one or more network device identifiers to the server.

15. A non-transitory computer readable storage medium configured to store instructions, the instructions comprising a method, the method comprising the steps of:
   scanning, by a digital device, an area for wireless networks;
   receiving, in response to the scanning by the digital device, two or more Basic Service Set Identifications (BSSIDs), each of the BSSIDs being associated with at least one of two or more wireless networks;
   generating, by the digital device, a location request in a Domain Name System (DNS) protocol formatted message, the location request comprising the two or more BSSIDs;
   providing, by the digital device, the location request over an open port of a network access device associated with the at least one of the two or more wireless networks, the open port supporting DNS services even if the network access device has not granted network access to the digital device;
   receiving, by the digital device, a DNS protocol formatted location response based on the location request;
   retrieving at least one location identifier and at least one credential from the location response, the at least one location identifier and the at least one credential being selected by a server from a plurality of location identifiers and a plurality of credentials based on at least one of the two or more BSSIDs of the location request; and
   establishing, by the digital device, a connection to the network access device associated with the at least one location identifier, using the at least one credential to access the at least one of the two or more wireless networks.

* * * * *